US006879348B1

(12) United States Patent
Niida

(10) Patent No.: US 6,879,348 B1
(45) Date of Patent: Apr. 12, 2005

(54) METHOD AND APPARATUS FOR CONTROLLING THE FUNCTIONS OF AN IMAGE CAPTURING APPARATUS

(75) Inventor: Mitsuo Niida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/492,092

(22) Filed: Jan. 27, 2000

(30) Foreign Application Priority Data

Jan. 26, 1999 (JP) .......................................... 11-017745
Jan. 24, 2000 (JP) ...................................... 2000-014789

(51) Int. Cl.[7] .............................. H04N 7/00; H04N 5/44
(52) U.S. Cl. ...................... 348/552; 348/553; 348/569
(58) Field of Search ............................... 348/552, 553, 348/563, 569, 570, 649, 650, 674, 673, 678, 687, 14.01–14.12; 725/70, 80, 82, 85, 72, 37, 135, 116, 9, 117; 345/798; H04N 5/232

(56) References Cited

U.S. PATENT DOCUMENTS

| | | | | |
|---|---|---|---|---|
| 4,706,108 A | * | 11/1987 | Kumagai et al. .............. 358/10 |
| 5,815,205 A | * | 9/1998 | Hashimoto et al. .......... 348/373 |
| 5,999,213 A | * | 12/1999 | Tsushima et al. ........... 348/180 |
| 6,037,939 A | * | 3/2000 | Kashiwagi et al. .......... 345/798 |
| 6,137,539 A | * | 10/2000 | Lownes et al. .............. 348/569 |
| 6,150,953 A | * | 11/2000 | Tanaka et al. .......... 340/825.37 |
| 6,233,393 B1 | * | 5/2001 | Yanagihara et al. ........ 386/125 |
| 6,249,914 B1 | * | 6/2001 | Harrison et al. ............. 725/141 |
| 6,288,749 B1 | * | 9/2001 | Freadman ................... 348/522 |
| 6,298,405 B1 | * | 10/2001 | Ito et al. ...................... 710/107 |
| 6,326,935 B1 | * | 12/2001 | Boger .......................... 345/12 |
| 6,332,159 B1 | * | 12/2001 | Hatae et al. ................. 709/224 |
| 6,336,155 B1 | * | 1/2002 | Ito et al. ....................... 710/37 |
| 6,380,990 B1 | * | 4/2002 | Bessel ......................... 348/806 |
| 6,400,280 B1 | * | 6/2002 | Osakabe ................ 340/825.25 |

FOREIGN PATENT DOCUMENTS

| | | | | |
|---|---|---|---|---|
| EP | 1026580 A2 | * | 9/2000 | ............. G06F/3/14 |
| JP | 40503842 A | * | 2/1993 | .......... H04N/5/232 |

OTHER PUBLICATIONS

"AV/C Camera Subunit Specification", 1394 Trade Association, version 1.0, Jan. 11, 1999, pp 1–59.

\* cited by examiner

Primary Examiner—Michael H. Lee
Assistant Examiner—Paulos M. Natnael
(74) Attorney, Agent, or Firm—Fitzpatrick, Cella, Harper & Scinto

(57) ABSTRACT

A method and apparatus for remotely controlling adjusting functions of an image capturing apparatus. The functions include contrast, gamma, sharpness, aperture, and contrast. A control apparatus transmits to the image capture apparatus a first command requesting a current function value of an adjusting function of the image capture apparatus and a second command requesting a remotely controllable range of the adjusting function. The control apparatus detects the current function value of the adjusting function from a response to the first command and a remotely controllable range of the adjusting function from a response to the second command. The control apparatus then displays the current function value and the remotely controllable range of the adjusting function on a display unit of the control apparatus.

8 Claims, 20 Drawing Sheets

| CTS code msb lsb | CTS |
|---|---|
| 0000 | AV/C |
| 0001 | reserved for CAL |
| 0010 | reserved for EHS |
| 0011 ⋮ 1101 | reserved |
| 1110 | Vendor Unique |
| 1111 | Extended CTS |

FIG. 8

| code (binary) MSB LSB | Command Type (ctype) |
|---|---|
| 0000 | CONTROL |
| 0001 | STATUS |
| 0010 | SPECIFIC INQUIRY |
| 0011 | NOTIFY |
| 0100 | GENERAL INQUIRY |
| 0101 | (reserved) |
| 0110 | (reserved) |
| 0111 | (reserved) |

FIG. 9

| code (binary) MSB LSB | Subunit_Type |
|---|---|
| 00000 | Video Monitor |
| 00001 | (reserved) |
| 00010 | (reserved) |
| 00011 | disc recorder/player |
| 00100 | Video Cassette Recorder (VCR) |
| 00101 | Tuner |
| 00110 | (reserved) |
| 00111 | Camera |
| 01000 ⋮ 11011 | (reserved) |
| 11100 | Vendor unique |
| 11101 | (reserved) |
| 11110 | Expansion subunit_type |
| 11111 | Unit |

FIG. 10

| code (binary) MSB LSB | Response |
|---|---|
| 1000 | NOT INPLEMENTED |
| 1001 | ACCEPTED |
| 1010 | REJECTED |
| 1011 | IN TRANSITION |
| 1100 | IMPLEMENTED/STABLE |
| 1101 | CHANGED |
| 1110 | (reserved) |
| 1111 | INTERIM |

FIG. 11

| Command name | opcode value |
|---|---|
| APERTURE | $40_{16}$ |
| BRIGHTNESS | $41_{16}$ |
| CHROMA | $42_{16}$ |
| CONTRAST | $43_{16}$ |
| PHASE | $44_{16}$ |
| RANGE | $70_{16}$ |

FIG. 12

| | msb ... lsb |
|---|---|
| opcode | RANGE ($70_{16}$) |
| operand[0] | range_mode |
| operand[1] | $FF_{16}$ |
| operand[2] | |

FIG. 13

| | msb ... lsb |
|---|---|
| opcode | RANGE ($70_{16}$) |
| operand[0] | range_mode |
| operand[1] | minimum_value |
| operand[2] | maximum_value |

FIG. 16

| | msb | | | | | | | lsb |
|---|---|---|---|---|---|---|---|---|
| opcode | | | BRIGHTNESS ($41_{16}$) | | | | | |
| operand[0] | | | $00_{16}$ | | | | | |

FIG. 17

| | msb | | | | | | | lsb |
|---|---|---|---|---|---|---|---|---|
| opcode | | | RANGE ($70_{16}$) | | | | | |
| operand[0] | | | BRIGHTNESS ($41_{16}$) | | | | | |
| operand[1] | | | $03_{16}$ | | | | | |
| operand[2] | | | $05_{16}$ | | | | | |

FIG. 18

| | msb | | | | | | | lsb |
|---|---|---|---|---|---|---|---|---|
| opcode | | | BRIGHTNESS ($41_{16}$) | | | | | |
| operand[0] | | | $02_{16}$ | | | | | |

FIG. 19

| | msb | | | | | | | lsb |
|---|---|---|---|---|---|---|---|---|
| opcode | | | RANGE ($70_{16}$) | | | | | |
| operand[0] | | | BRIGHTNESS ($41_{16}$) | | | | | |
| operand[1] | | | $06_{16}$ | | | | | |
| operand[2] | | | $0A_{16}$ | | | | | |

FIG. 20A
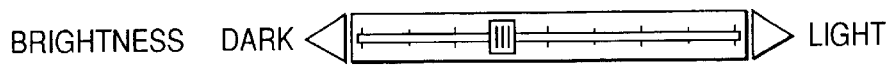
BRIGHTNESS DARK ◁ LIGHT ▷
FIG. 20B
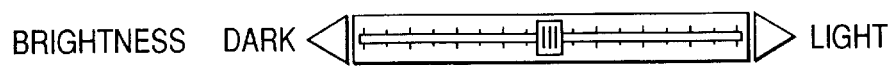
BRIGHTNESS DARK ◁ LIGHT ▷
FIG. 21
| Command name | opcode value |
|---|---|
| CONTRAST | $55_{16}$ |
| GAMMA | $52_{16}$ |
| HUE | $5C_{16}$ |
| SATURATION | $5B_{16}$ |
| SETUP LEVEL | $54_{16}$ |
| SHARPNESS | $56_{16}$ |
| RANGE | $70_{16}$ |
| IRIS | $43_{16}$ |
| IRIS RANGE | $75_{16}$ |
FIG. 22
| | msb | | | | | | lsb |
|---|---|---|---|---|---|---|---|
| opcode | IRIS RANGE ($75_{16}$) ||||||| 
| operand[0] | $FF_{16}$ |||||||
| operand[1] | |||||||
FIG. 23
| | msb | | | | | | lsb |
|---|---|---|---|---|---|---|---|
| opcode | IRIS RANGE ($75_{16}$) |||||||
| operand[0] | open_f_number |||||||
| operand[1] | maximum_f_number |||||||

FIG. 27

| Name | opcode value |
|---|---|
| APERTURE | $40_{16}$ |
| BRIGHTNESS | $41_{16}$ |
| CHROMA | $42_{16}$ |
| CONTRAST | $43_{16}$ |
| PHASE | $44_{16}$ |
| SUPPORT LEVEL PROFILE | $72_{16}$ |

FIG. 28

| Operand | Bit | Description |
|---|---|---|
| operand[0] | bit7(MSB) | APERTURE command |
| | bit6 | BRIGHTNESS command |
| | bit5 | CHROME command |
| | bit4 | CONTRAST command |
| | bit3 | PHASE command |
| | bit2 | reserved |
| | bit1 | |
| | bit0(LSB) | |

FIG. 29

| | msb ......... lsb |
|---|---|
| opcode | SUPPORT LEVEL PROFILE ($72_{16}$) |
| operand[0] | $FF_{16}$ |

FIG. 30

| | msb ......... lsb |
|---|---|
| opcode | SUPPORT LEVEL PROFILE ($72_{16}$) |
| operand[0] | profile |

METHOD AND APPARATUS FOR CONTROLLING THE FUNCTIONS OF AN IMAGE CAPTURING APPARATUS

BACKGROUND OF THE INVENTION

1. Field of the Invention

The present invention relates to a data communication apparatus, method and system and to a storage medium, and more particularly to techniques of remotely controlling a desired function of an apparatus connected in a network via which information data (including image data and the like) and command data are transferred at high speed.

2. Related Background Art

Conventional peripheral apparatus of a personal computer (hereinafter described as PC) are hard disk drives and printers. These peripheral apparatus are connected to PC via a dedicated input/output interface or a general digital interface such as SCSI (small computer system interface).

Recently, AV (audio/visual) apparatus such as digital cameras and digital video cameras dealing with still and moving images have been paid attention as other types of PC peripheral apparatus. Still and moving images handled with an AV apparatus have a very large amount of data, and a conventional dedicated interface or SCSI interface is associated with the following problems: (a) low data transfer rate; (b) limit in connection methods; (c) small number of connectable peripheral apparatus and their types; (d) thick cable; (e) high cost; and the like.

IEEE 1394-1995 specifications are known as one type of next generation high speed and high performance digital interface techniques capable of solving such problems. A digital interface in conformity with the IEEE 1394-1995 specifications (hereinafter called a 1394 interface) has the following characteristic functions:

(1) high data transfer rate;
(2) support for real time data transfer mode (i.e., isochronous transfer mode);
(3) connection structure (topology) with high degree of freedom; and
(4) support for plug & play function and hot swapping function.

A network configured by conventional 1394 interfaces (hereinafter called a 1394 serial bus system) is, however, associated with the following problems.

In the conventional 1394 serial bus system, when an apparatus remotely controls one of a plurality of functions supported by a remote apparatus, the apparatus cannot know the operable or controllable range of the function although it can transmit a control signal for controlling the function. Therefore, in order to know the operable range of the function, a user is required to actually operate the function in order to know to which range the function can be operated and from which range the function cannot be operated. There are therefore problems such as cumbersome range detection procedure, considerable process operation delay, lowered communication efficiency, poor user operability, and the like.

Also in a conventional 1394 serial bus system, there is another problem that an apparatus cannot inquire some remotely operable functions collectively among a plurality of functions supported by a remote apparatus. Because of this problem, each apparatus is required to inquire whether each function supported by a remote apparatus can be remotely operated. There are therefore problems such as cumbersome inquiry procedure, considerable process operation delay, lowered communication efficiency, poor user operability, and the like.

SUMMARY OF THE INVENTION

An object of the present invention is to solve the above-described problems.

Another object of the invention is to provide a data communication apparatus, method and system and a storage medium storing programs for realizing such method, by realizing techniques of efficiently detecting a controllable range of a plurality of functions supported by an arbitrary apparatus.

Another object of the invention is to realize techniques of efficiently detecting remotely controllable functions among a plurality of functions supported by an arbitrary apparatus.

As a preferred embodiment for such objects, the invention discloses a data communication apparatus for remotely controlling an image apparatus which processes a digital image, comprising: (a) a communication unit for transmitting a first command for inquiring an operable range of a predetermined function of the image apparatus and a second command which controls the predetermined function; (b) a display unit responsive to a response to the first command for displaying the operable range of the predetermined function; and (c) a control unit for generating the second command.

The invention also discloses a data communication apparatus, comprising: (a) an image processing unit for processing a digital image; and (b) a communication unit for transmitting a first command for inquiring an operable range of a predetermined function of the image processing unit and a second command which controls the predetermined function, wherein the data communication apparatus transmits data representative of the operable range of the predetermined function in response to the first command, and controls the predetermined function in response to the second command.

As another embodiment, the invention discloses a data communication method for remotely controlling an image apparatus which processes a digital image, comprising the steps of: (a) transmitting a first command for inquiring an operable range of a predetermined function of the image apparatus; (b) receiving a response to the first command; (c) displaying the operable range of the predetermined function in accordance with the response to the first command; and (d) transmitting a second command for controlling the predetermined function.

The invention also discloses a data communication method, comprising the steps of: (a) transmitting a first command for inquiring an operable range of a predetermined function of an image processing unit which processes a digital image; (b) transmitting data representative of the operable range of the predetermined function in response to the first command; (c) receiving a second command for controlling the predetermined function; and (d) controlling the predetermined function in accordance with the second command.

As another embodiment, the invention discloses a data communication system, comprising: (a) an image apparatus for processing a digital image; and (b) a data communication apparatus for remotely controlling the image apparatus, wherein: the data communication apparatus transmits a first command for inquiring an operable range of a predetermined function of the image apparatus and a second command which controls the predetermined function, and displays the operable range of the predetermined function in accordance with a response to the first command; and the image apparatus transmits data representative of the operable range of the predetermined function in response to the first command and controls the predetermined function in response to the second command.

As another embodiment, the invention disclosed a storage medium storing a program, the program remotely controlling an image apparatus which processes a digital image and comprising: (a) a procedure of transmitting a first command for inquiring an operable range of a predetermined function of the image apparatus; (b) a procedure of receiving a response to the first command; (c) a procedure of displaying the operable range of the predetermined function in accordance with the response to the first command; and (d) a procedure of transmitting a second command for controlling the predetermined function.

The invention also discloses a storage medium storing a program, the program comprising: (a) a procedure of transmitting a first command for inquiring an operable range of a predetermined function of an image processing unit which processes a digital image; (b) a procedure of transmitting data representative of the operable range of the predetermined function in response to the first command; (c) a procedure of receiving a second command for controlling the predetermined function; and (d) a procedure of controlling the predetermined function in accordance with the second command.

In another aspect of the invention, a method and a control apparatus are provided for remotely controlling adjusting functions of an image capture apparatus including various adjustable functions. The adjusting functions include contrast, gamma, sharpness, aperture, and contrast. The method includes the steps of transmitting from the control apparatus to the image capture apparatus a first command requesting a current function value of an adjusting function of the image capture apparatus, transmitting from the control apparatus to the image capture apparatus a second command requesting a remotely controllable range of the adjusting function, detecting the current function value of the adjusting function from a response of the first command transmitted by the image capture apparatus, detecting the remotely controllable range of the adjusting function from a response of the second command transmitted by the image capture apparatus, and displaying the current function value and the remotely controllable range of the adjusting function on a display unit of the control apparatus.

Still other objects of the present invention, and the advantages thereof, will become fully apparent from the following detailed description of the embodiments.

BRIEF DESCRIPTION OF THE DRAWINGS

FIG. 8 is a diagram showing command types (ctype) of the command frame.

FIG. 9 is a diagram showing subunit_types in the command frame and response frame.

FIG. 10 is a diagram showing response types and their values in the response frame.

FIG. 11 is a diagram showing an example of opcodes defined in this embodiment.

FIG. 12 is a diagram illustrating RANGE STATUS commands in this embodiment.

FIG. 13 is a diagram illustrating RANGE STATUS responses of this embodiment.

FIG. 16 is a diagram showing an example of a BRIGHTNESS STATUS response.

FIG. 17 is a diagram showing an example of a RANGE STATUS response.

FIG. 18 is a diagram showing another example of the BRIGHTNESS STATUS response.

FIG. 19 is a diagram showing another example of the RANGE STATUS response.

FIGS. 20A and 20B are diagrams showing an example of a brightness indicator.

FIG. 21 is a diagram showing another example of opcodes defined in this embodiment.

FIG. 22 is a diagram showing the structure of an IRIS RANGE STATUS command of this embodiment.

FIG. 23 is a diagram showing the structure of an IRIS RANGE STATUS response of this embodiment.

FIG. 27 is a diagram showing another example of opcodes defined in this embodiment.

FIG. 28 is a diagram illustrating a PROFILE field of this embodiment.

FIG. 29 is a diagram showing the structure of a SUPPORT LEVEL PROFILE STATUS command of this embodiment.

FIG. 30 is a diagram showing the structure of a SUPPORT LEVEL PROFILE STATUS response of this embodiment.

DETAILED DESCRIPTION OF THE PREFERRED EMBODIMENTS

The preferred embodiments of the present invention will be described in detail hereinafter with reference to the accompanying drawings.

First, referring to FIG. 1, the fundamental functions of 1394 interfaces (1394 I/F) 14, 32 and 72 used by data communication apparatus 10, 30, 56 will be described.

The 1394 interfaces (1394 I/F) 14, 32 and 72 can deal with daisy chain connection and node branch, providing a high degree of connection freedom. The 1394 interfaces (1394 I/F) 14, 32 and 72 automatically execute a bus reset when a connected apparatus is removed, a new apparatus is connected, or the power of the connected apparatus is turned on or off.

Each time a bus reset is initiated, the 1394 interfaces (1394 I/F) 14, 32 and 72 automatically recognize a new connection topology and assign ID information (node information) to each apparatus. With this function, the 1394 interfaces (1394 I/F) 14, 32 and 72 can always recognize a new network topology.

The 1394 interfaces (1394 I/F) 14, 32 and 72 have a function of relaying data transmitted from another apparatus. With this function, all apparatus can grasp the operation status of the bus.

The 1394 interfaces (1394 I/F) 14, 32 and 72 have a function called Plug & Play. With this function, a new apparatus can be recognized automatically when it is connected without turning off the powers of all apparatus.

The 1394 interfaces (1394 I/F) 14, 32 and 72 are compatible with the data transfer rates of 100/200/400 Mbp. Since the apparatus having the higher data transfer rate can support the lower data transport rate, apparatus having different data transfer rates can be connected together.

Furthermore, the 1394 interfaces (1394 I/F) 14, 32 and 72 are interoperable with two different data transfer modes (isochronous transfer mode and asynchronous transfer mode). In the isochronous transfer mode, a transfer bandwidth is ensured in each communication cycle period for a predetermined period. Therefore, the isochronous transfer mode is effective for transferring data (particularly moving images, audio data and the like) required to continuously transfer (i.e., transfer in real time) a predetermined amount of data at a constant data rate.

The asynchronous transfer mode is effective for transferring data (e.g., control command, file data and the like) required to asynchronously transfer data to a designated node when necessary. The asynchronous transfer mode can answer back a reception event so that more reliable communication than the isochronous transfer mode is possible. Both the isochronous transfer mode and asynchronous transfer mode can be mixed in each communication cycle (generally one cycle is 125 $\mu$s).

Figure 2:
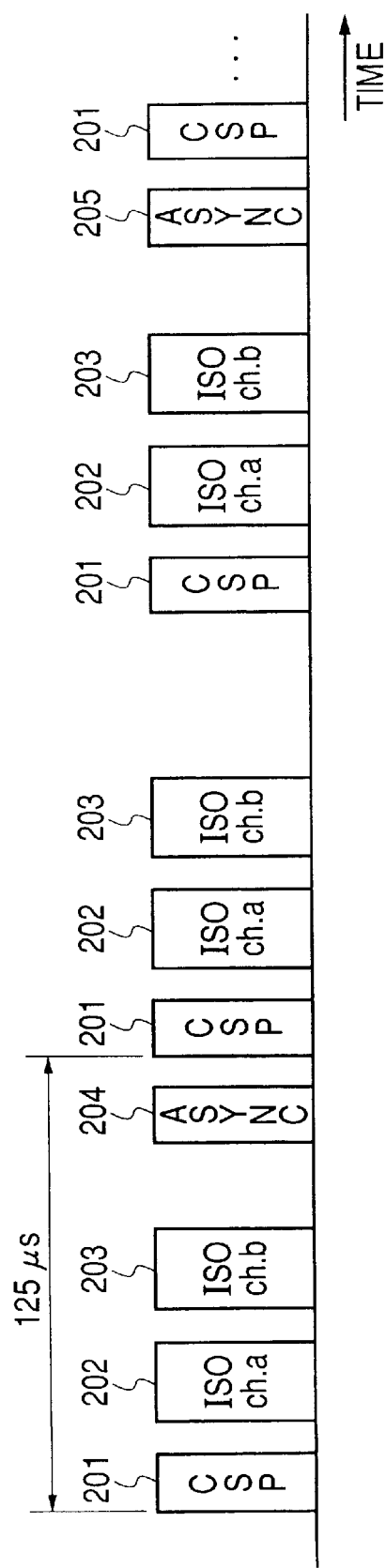
FIG. 2 is a diagram illustrating an isochronous transfer mode and an asynchronous transfer mode.

As shown in FIG. 2, each transfer mode is executed after a cycle start packet (hereinafter described as CSP) 201 indicating a start of one communication cycle is transferred.

In FIG. 2, reference numerals 202 and 203 represent communication packets (hereinafter called isochronous packets) respectively transferred in each communication packet in the isochronous transfer mode. Reference numerals 204 and 205 represent communication packets (hereinafter called asynchronous packets) respectively transferred in the asynchronous transfer mode.

In each communication cycle period, the isochronous transfer mode has a priority order higher than the asynchronous transfer mode. The transfer bandwidth of the isochronous transfer mode is ensured in each communication cycle.

Next, the constituent components of the 1394 interfaces 14, 32 and 72 will be described with reference to FIG. 3.

The 1394 interfaces 14, 32 and 72 each are constituted of a plurality of functional layers (hierarchical layers). Referring to FIG. 3, the 1394 interfaces 14, 32 and 72 are connected to each other via a communication cable 301 in conformity with the IEEE 1394-1995 specifications. Each of the 1394 interfaces 14, 32 and 72 has one or more communication ports 302 each being connected to a physical layer 303 included in a hardware section.

Figure 3:
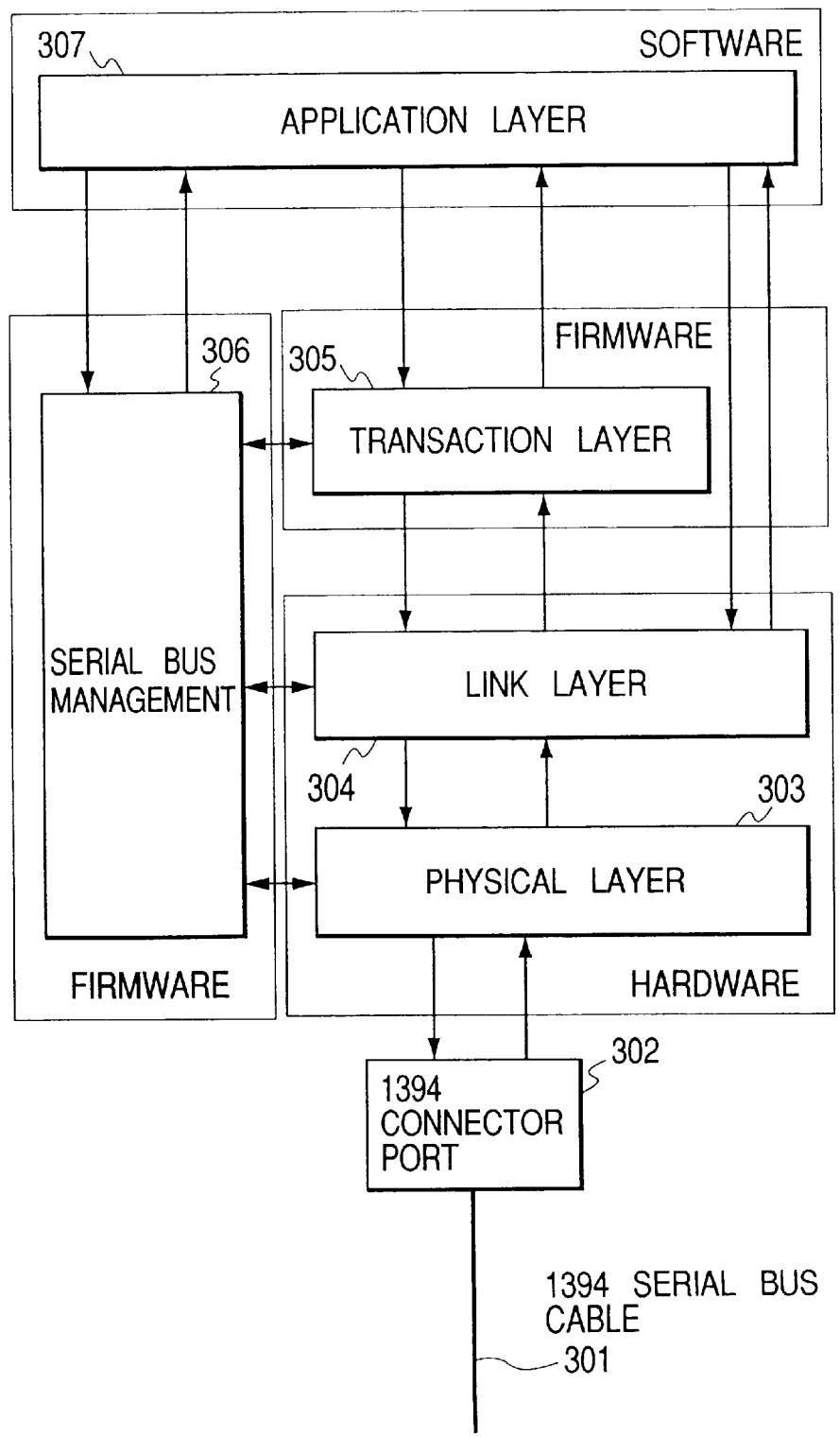
FIG. 3 is a diagram illustrating constituent components of the 1394 interface.

In FIG. 3, the hardware section is constituted of the physical layer 303 and a link layer 304. The physical layer 303 performs physical and electric interface with another node, bus reset detection and its initialization, input/output signal coding/decoding, bus use privilege arbitration and the like. The link layer 304 performs communication packet generation and reception/transmission, cycle timer control and the like.

In FIG. 3, a firmware section includes a transaction layer 305 and a serial bus management 306. The transaction layer 305 manages the asynchronous transfer mode and provides various transactions (read, write, lock).

The serial bus management 306 provides the functions of own node control, management of own node connection status, management of own node ID information, management of resources of a serial bus network, in accordance with IEEE 1212 CSR (control status register).

The hardware section and firmware section substantially constitute the 1394 interface, and the fundamental structure thereof is stipulated in the IEEE 1394-1995 specifications.

An application layer 307 included in a software section is different for each application to be used, and controls how data is communicated on the network. For example, if moving image data recorded in a digital VTR is to be transmitted or received, an AV/C (audio/video control) protocol stipulated in IEC 61883 specifications is executed.

Various commands (to be described later) in this embodiment are used for expanding the functions of the hardware section and firmware section and for providing novel functions to various programs (to be described later) processed by the software section.

Next, with reference to FIG. 1, an example of the structure of the data communication system of this embodiment will be described. As shown in FIG. 1, the data communication system of this embodiment is constituted of, for example, a computer 10, a digital television 30, and a digital video camcorder 56.

Figure 1:
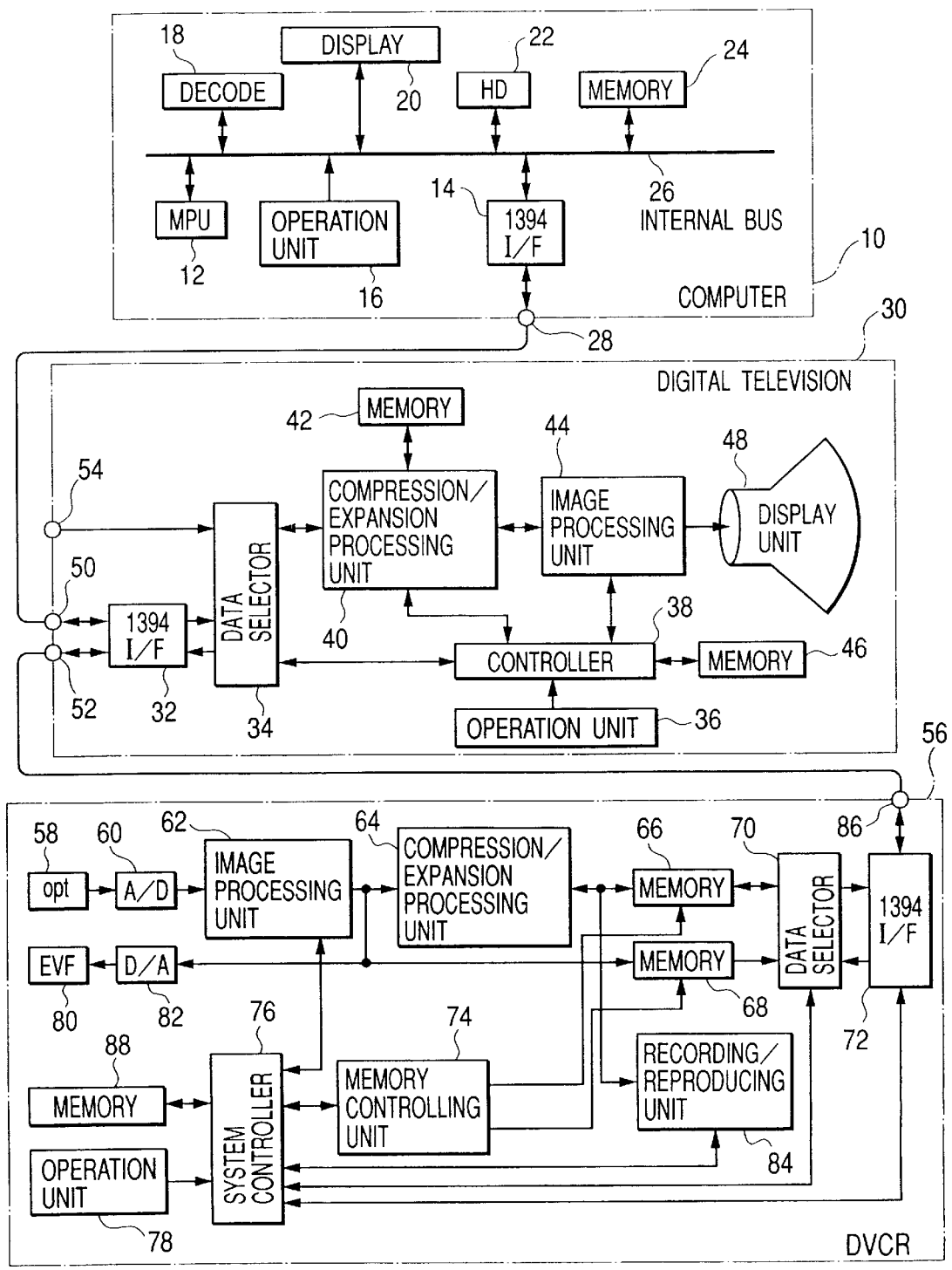
FIG. 1 is a block diagram showing an example of a data communication system according to an embodiment of the invention.

Referring to the computer 10 shown in FIG. 1, reference numeral 12 represents a microprocessor unit (MPU) for controlling the operation of the computer 10. Reference numeral 14 represents a 1394 interface with the fundamental functions described above. Reference numeral 16 represents an operation unit with a keyboard, a mouse and the like. Reference numeral 18 represents a decoder for decoding compression-encoded digital data (such as moving image data, still image data and audio data). Reference numeral 20 represents a display such as a CRT display and a liquid crystal display panel.

Reference numeral 22 represents a hard disk (HD) for recording various data (such as moving image data, still image data, audio data, graphics data, text data and program data). The hard disk 22 stores therein an image quality setting application to be described later in the form of program codes readable by MPU 12.

Reference numeral 24 represents an internal memory, and reference numeral 26 represents an internal bus such as a PCI bus for interconnecting each device in the computer 10. Reference numeral 28 represents a 1394 interface terminal for connection between the 1394 interface 14 and another 1394 interface.

Referring to the digital television (hereinafter called digital TV) 30 shown in FIG. 1, reference numeral 32 represents the 1394 interface with the fundamental functions described earlier. Reference numeral 34 represents a data selector. Reference numeral 36 represents an operation unit with a remote controller and an operation panel. Reference numeral 38 represents a controller with a microcomputer for controlling the operation of the digital TV 30.

Reference numeral 40 represents a compression/expansion processing unit having a function of expanding and decoding compression-encoded digital data (such as moving image data, still image data and audio data) and a function of digitalizing an analog video signal and executing high efficiency encoding (e.g., after orthogonal transformation in the predetermined image unit, quantization and variable-length encoding are executed, as in MPEG and DV).

Reference numeral 42 represents a memory providing a working memory space necessary for the operation by the compression/expansion processing unit 40. Reference numeral 44 represents an image processing unit for converting still image data and moving image data decoded by the compression/expansion processing unit 40 into the data format suitable for a display 48 at the succeeding stage. Reference numeral 46 represents an internal memory providing a working memory space necessary for the operation by the controller 38, the internal memory 46 storing program codes and the like readable by the controller 38.

The display 48 is a display device such as a cathode ray tube (hereinafter described as CRT), a liquid crystal display and a plasma display. Reference numerals 50 and 52 represent 1394 interface terminals for connection between the 1394 interface 32 and other 1394 interfaces. Reference numeral 54 represents a video input terminal for inputting an analog video signal supplied from an external apparatus.

Referring to the digital video camcorder (hereinafter described as DVCR) 56 shown in FIG. 1, reference numeral 58 represents an image pickup unit (opt) for converting an optical image of an object into an electric signal. Reference numeral 60 represents an analog-digital (A/D) converter. Reference numeral 62 represents an image processing unit for converting digitalized moving images and still images into digital image data having a predetermined format.

Reference numeral 64 represents a compression/expansion processing unit having a function of expanding and decoding compression-encoded digital data (such as moving image data, still image data and audio data) and a function of digitalizing an analog video signal and executing high efficiency encoding (e.g., after orthogonal transformation in the predetermined image unit, quantization and variable-length encoding are executed, as in MPEG and DV).

Reference numeral 66 represents a memory for temporarily storing high efficiency encoded digital video data. Reference numeral 68 represents a memory for temporarily storing not high efficiency encoded digital video data. Reference numeral 70 represents a data selector, and reference numeral 72 represents the 1394 interface having the fundamental functions described earlier. Reference numeral 74 represents a memory controller which controls the read/write of the memories 66 and 68.

Reference numeral 76 represents a system controller having a microcomputer for controlling the operation of DVCR. Reference numeral 78 represents an operation unit having a remote controller, an operation panel and the like. Reference numeral 82 represents a D/A converter. Reference numeral 84 represents a recording/reproducing unit having a recording medium such as a magnetic tape, a magnetic disc and a magnetooptic disk for recording various digital data (such as moving image data, still image data, and audio data).

Reference numeral 86 represents a 1394 interface terminal for connection between the 1394 interface 72 and another 1394 interface. Reference numeral 88 represent a rewritable memory such as EEPROM which stores program codes and the like readable by the controller 76.

As shown in FIG. 1, communication apparatus (hereinafter called node) including the computer 10, digital TV 30 and DVCR 56 are interconnected via the 1394 interfaces 14, 32 and 72 (the data communication system of this embodiment constituted of the 1394 interfaces 14, 32 and 72 is hereinafter simply called "1394 serial bus").

By defining a predetermined communication protocol, each communication apparatus can receive/transmit various digital data (such as moving image data, still image data, audio data, graphics data, text data and program data) and can execute a remote operation using command data.

Next, with reference to FIG. 1, the operation of each node constituting the communication system of this embodiment will be described.

First, the function and operation of each device constituting the computer 10 will be described. The computer 10 of this embodiment operates as a controller for controlling transmission/reception of digital image data between the digital TV 30 and DVCR 56 and as a controller for remote operation of the functions of the digital TV 30 and DVCR 56.

MPU 12 executes software stored in the hard disk 22 and moves various data to the internal memory 24. MPU 12 also executes an arbitration operation between devices connected to the internal bus 26.

The 1394 interface 14 can receive digital video data transferred via the 1394 serial bus and can transmit digital video data stored in the hard disk 22 and internal memory 24 to the 1394 serial bus.

The 1394 interface 14 can also transmit a control command for remotely controlling another node on the 1394 serial bus. The 1394 interface 14 also has a function of transferring a signal to be transferred via the 1394 serial bus to another node.

A user selects a desired application via the operation unit 16 and makes MPU 12 execute the application stored in the hard disk 22. Information on the application is displayed on the display 20 to show it to the user. In accordance with the application, the decoder 18 decodes video data received via the 1394 serial bus. The decoded video data is displayed on the display 20 to show it to the user.

Next, the function and operation of the device constituting the digital TV 30 will be described. The digital TV 30 of this embodiment operates as an image output apparatus (source) for outputting digital video data.

The 1394 interface 32 receives digital video data transferred via the 1394 serial bus and control command for controlling the operation of the digital TV 30. The digital video data is transferred in the isochronous transfer mode.

The 1394 interface 32 transmits a response to the control command in accordance with the communication protocol to be described later. The 1394 interface 32 has also a function of transferring a signal transferred via the 1394 serial bus to another 1394 interface.

The received digital video data is supplied via the data selector 34 to the compression/expansion processing unit 40.

The compression/expansion processing unit 40 expands and decodes the digital video data by using the memory 42 and supplies the result to the image processing unit 44. The image processing unit 44 executes various image processing (particularly display image quality control) for the decoded digital video data, and supplies the result to the display 48. The display 48 displays digital video data output from the image processing unit 44.

The received control command is supplied via the data selector 34 to the controller 38. In accordance with the control command, the controller 38 executes various controls such as switching of the data selector 34 and the image quality control of digital video data to be processed by the image processing unit 44. The controller 38 stores various information of the image quality of digital video data in the internal memory 46.

An analog video signal supplied from an unrepresented external apparatus is input to the video input terminal 54. The input analog video signal is supplied via the data selector 34 to the compression/expansion processing unit 40. The compression/expansion processing unit 40 digitalizes the analog video signal and supplies the result to the image processing unit. The image processing unit 44 executes various image processing (particularly display image quality control) for the digital video data, and supplies the result to the display 48. The display 48 displays the digital video data output from the image processing unit 44.

The compression/expansion processing unit 40 also executes high efficiency encoding (e.g., after orthogonal transformation in the predetermined image unit, quantization and variable-length encoding are executed, as in MPEG and DV), and supplies the result via the data selector 34 to the 1394 interface 32. The digital video data supplied to the 1394 interface 32 is transferred in the isochronous transfer mode.

The data selector 34 selects one of the 1394 interface terminals 50 and 52 and video input terminal 54 for signal input/output therethrough. The controller 38 sets the input and output terminals in accordance with an instruction from the operation unit 36 or a received control command. The data selector 34 executes a proper setting of the input and output terminals in accordance with the setting by the controller 38.

Next, the function and operation of each device constituting DVCR 56 will be described.

In this embodiment, DVCR 56 operates as an image input apparatus (destination) for inputting digital video data. The image pickup unit 58 converts the optical image of an object into electric signals including luminance (Y) and color difference (C) signals, and supplies them to the A/D convertor 60. The A/D convertor 60 digitalizes the electric signals.

The image processing unit 62 executes predetermined image processing for the digitalized luminance and color difference signals and multiplexes them. The compression/expansion processing unit 64 compresses the data amount of digitalized luminance and color difference signals. The compression/expansion processing unit 64 may process in parallel the luminance and color difference signals by using independent compression processing circuits.

Alternatively, a common compression processing circuit may be used to time divisionally process the luminance and color difference signals. The compression/expansion processing unit 64 executes a shuffling process for compressed video data in order to make the data resistant to transmission path errors. This process can transform consecutive code errors (i.e., burst errors) into discrete errors (i.e., random errors) easy to be corrected or interpolated.

In this case, if this process is executed before the compression process, a variation in the information amount to be caused by coarse and dense images can be effectively uniformed by using variable length encoding such as run length. The compression/expansion processing unit 64 also executes error correction encoding for compressed video data in order to reduce errors during recording/reproducing.

The video data compressed by the compression/expansion processing unit 64 is supplied to the memory 66 and recording/reproducing unit 84. The recording/reproducing unit 84 records the error correction encoded and compressed video data in the recording medium such as a magnetic tape. The compressed video data is recorded in an independent record area as different from audio data.

The video data supplied from the image processing unit 62 to the D/A convertor 82 is D/A converted. An EVF 80 displays the analog video signal supplied from the D/A convertor 82. The video data processed by the image processing unit 62 is supplied also to the memory 68. Non-compressed video data is stored in the memory 68.

The 1394 interface 72 of DVCR 56 outputs both high efficiency encoded digital video data and not high efficiency encoded digital video data to the external. The selection between both of the digital data is made by a user via the operation unit 78.

The high efficiency encoded digital video data is temporarily stored in the memory 66, whereas the not high efficiency encoded digital video data is temporarily stored in the memory 68. The memory controller 74 controls the read/write of the memories 66 and 68 to supply the data stored in the memories 66 and 68 to the data selector 70.

The data selector 70 supplies the digital video data read from the memories 66 and 68 to the 1394 interface 72.

The 1394 interface 72 receives the digital video data isochronously transferred from the digital TV 30 and supplies it via the data selector 70 to the memory 66 or 68.

In accordance with a control command transmitted from the computer (controller) 10, the controller 76 of DVCR 56 can control the image processing by the recording/reproducing unit 84 and image processing unit 62. Particularly, the image processing unit 62 can adjust the image quality of digital video data to be recorded by the recording/reproducing unit 84, in accordance with the control by the control unit 76.

A control command for controlling the operation of DVCR 56 is received via the 1394 interface 72. The received control command is input via the data selector 70 to the controller 76. The controller 76 generates response data corresponding to the control command. The 1394 interface 72 transmits the response data in accordance with the communication protocol to be described later.

Data for adjusting the image quality of digital video data is written in the memory 88 so that the data can be retained even if the main power of DVCR 56 is turned off. Writing data into the memory 88 is executed when the 1394 interface 72 detects a bus reset (namely, when the 1394 cable of any apparatus on the 1394 serial bus is disconnected from the connector, when the main power of any apparatus is turned off, or at other timings).

Next, a function control protocol (FCP) will be described with reference to FIG. 4. FCP is a protocol designed for controlling a node connected to the 1394 serial bus system. FCP can utilize various preset commands and command transactions. With FCP, various command data and response data are transmitted in the asynchronous transfer mode. The 1394 interfaces 14, 32 and 72 of this embodiment support this FCP.

In this embodiment, a payload field of an asynchronous packet generated in accordance with FCP is called an "FCP frame". Also in this embodiment, a node which controls the operation of one or more nodes is called a "controller", and a node to be controlled is called a "target".

In this embodiment, an FCP frame (including various command data to be described later) transmitted from the controller to the target is called a "command frame", whereas an FCP frame (including various response data to be described later) transmitted from the target to the controller is called a "response frame".

A register prepared for reception of the command frame is called a "command register", whereas a register prepared for reception of the response frame is called a "response register".

Figure 4:
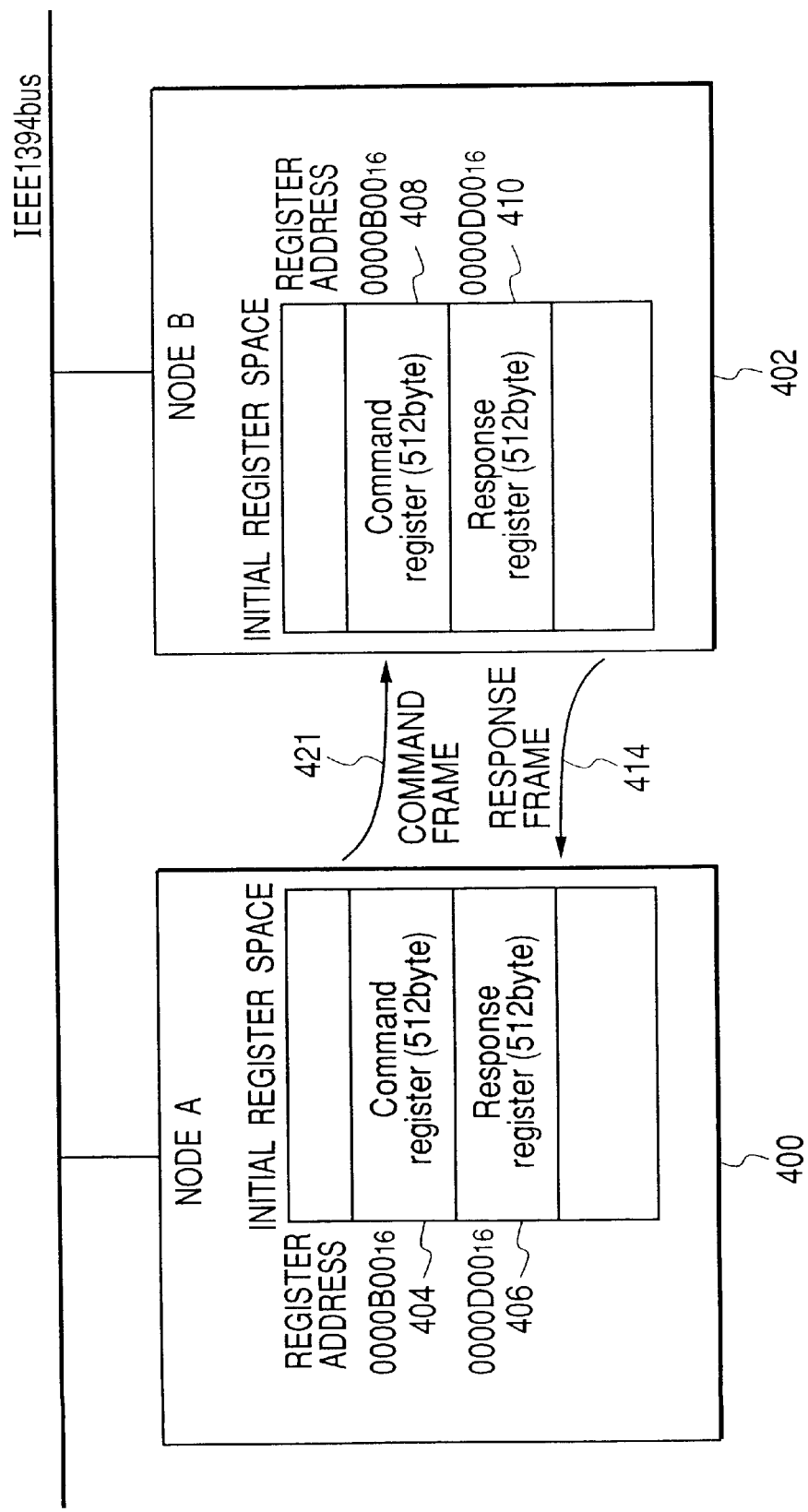
FIG. 4 is a diagram illustrating a function control protocol (FCP).

Referring to FIG. 4, reference numeral 400 represents a controller (node A), reference numeral 402 represents a target (node B), reference numeral 404 represents a command register of the controller 400, reference numeral 406 represents a response register of the controller 400, reference numeral 408 represents a command register of the target 402, and reference numeral 410 represents a response register of the target 402. The registers are assigned to different locations in the address space of each node. The value of a destination offset address designating each register is "FFFF F000 $0000_{16}$" for an initial register space, "FFFF F000 $0B00_{16}$" for the command resisters 404 and 408, and "FFFF F000 $0D00_{16}$" for the response registers 406 and 410.

In FIG. 4, reference numeral 412 represents a command frame to be transmitted from the controller 400 to the target 402 in the asynchronous transfer mode, and reference numeral 414 represents a response frame to be transmitted from the target 402 to the controller 400 in the asynchronous transfer mode. The command frame 412 is written in the command register 408 of the target 402 in accordance with the write transaction in the asynchronous transfer mode. On the other hand, the response frame 414 is written in the response register 406 of the controller 400 in accordance with the write transaction in the asynchronous transfer mode.

Next, the structure of an asynchronous packet generated by FCP will be described.

Figure 5:
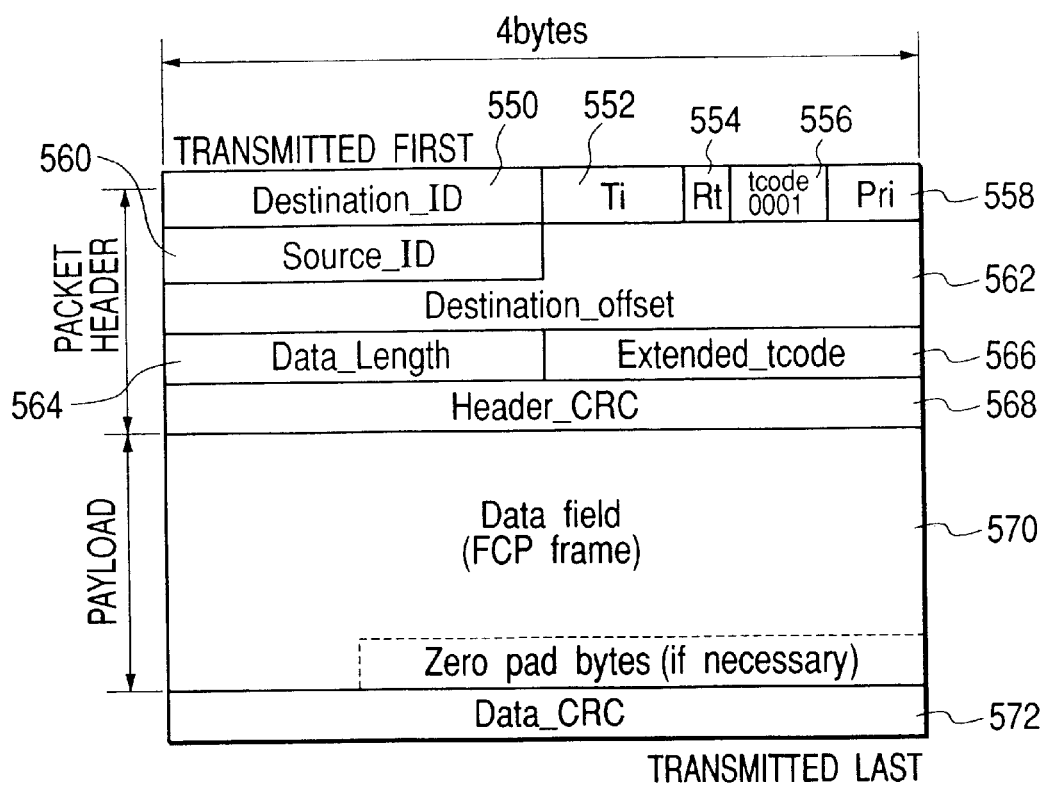
FIG. 5 is a diagram showing the structure of an asynchronous packet generated in accordance with FCP.

FIG. 5 shows the structure of a packet which transfers an FCP frame in the asynchronous transfer mode.

In FIG. 5, reference numeral 550 represents a node ID (Destination_ID) of the destination, reference numeral 552 represents a transaction level (Tl), reference numeral 554 represents a retry code (Rt), reference numeral 556 represents a transaction code (tcode), reference numeral 558 represents a priority (Pri), reference numeral 560 represents a source node ID (Source_ID), reference numeral 562 represents a destination offset address (Destination_offset), and reference numeral 564 represents a field for setting a data length (Date_Length) of the payload (data field).

Reference numeral 566 represents an extended transaction code (Extended_tcode), reference numeral 568 represents a header CRC (Header_CRC), reference numeral 570 represents data (including an FCP frame), and reference numeral 572 represents a field for setting a data CRC (Data_CRC). The asynchronous packet shown in FIG. 5 is constituted by 4 bytes (32 bits, hereinafter called a quadret).

In FIG. 5, the node ID of the destination node (reception destination) is set to the field 550 (16 bits). A tag specific to a transaction is set to the field 552 (6 bits). A code indicating whether the packet is retried is set to the field 554 (2 bits).

The format of a packet and the type of a transaction which is required to be executed are set to the field 556 (4 bits). For example, when a transaction of a data block write request is designated, the value of the field 556 is "$001_2$". A priority order is set to the field 558 (4 bits). In the case of FCP, the value of the field 558 is, for example, "$0000_2$".

The node ID of a source node (transmission source) is set to the field 560 (16 bits). An address (i.e., destination offset address) for designating a predetermined register in the address space of the destination node is set to the field 562 (48 bits). A byte length of the data field 570 is set to the field 564 (16 bits).

An extended transaction code is set to the field 566 (16 bits). For example, when a transaction for the data block write request is designated, the value of the field 566 is "$0001_{16}$". A CRC for error detection of the packet header is set to the field 568 (32 bits). The packet header is constituted of the fields 550 to 566.

A command frame and a response frame to be described later are set to the data field 570 (variable length). The data field 570 is also called a payload. If the data to be set to the data field 570 is smaller than a multiple of quadret (4 bytes), 0 is filled to the data field 570. A CRC for error detection of the data field 570 is set to the field 572 (32 bits).

Next, CTS (command/transaction set) which is one component of FCP will be described. CTS designates the command set, the structures of a command field and a response field of the FCP frame, and the transaction for transmitting a command and a response.

Figures 6A, 6B:
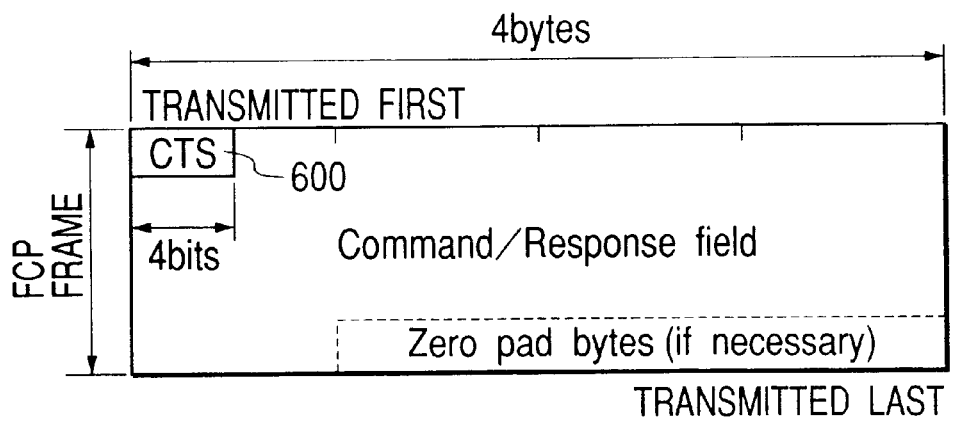
FIGS. 6A and 6B are diagrams showing the structure of an FCP frame.

FIG. 6A is a diagram showing the structure of an FCP frame used by CTS. In FIG. 6A, a field 600 (4 bits) designates the type of CTS. A relation between the value of the field 600 and the type of CTS is shown in FIG. 6B.

In the following description of the embodiment, it is assumed that the value CTS is "$0000_2$" and the structure of the FCP frame defined by AV/C digital interface command set general specifications (hereinafter called AV/C command set specifications) is used.

Figure 7A:
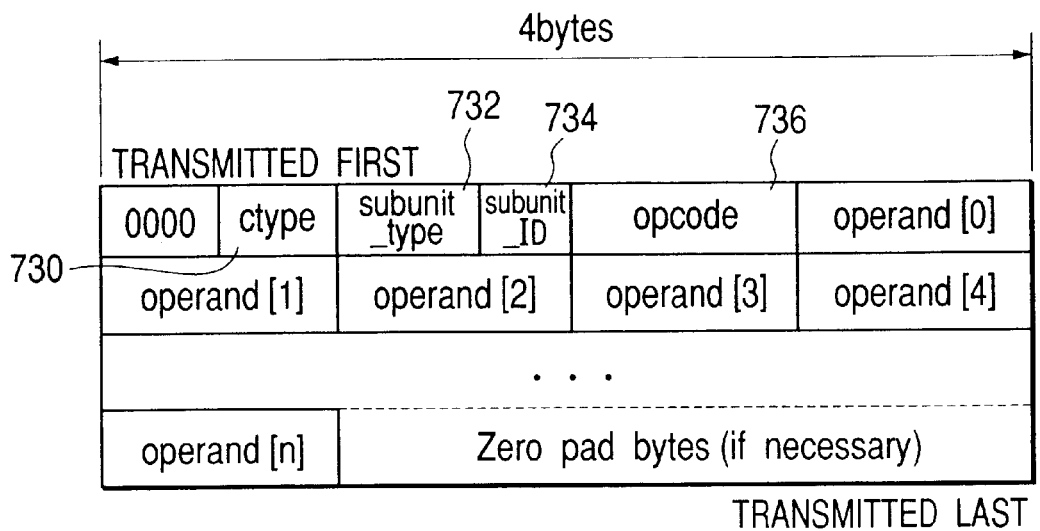
FIGS. 7A and 7B are diagrams showing the structure of a command frame and a response frame.
Figure 7B:
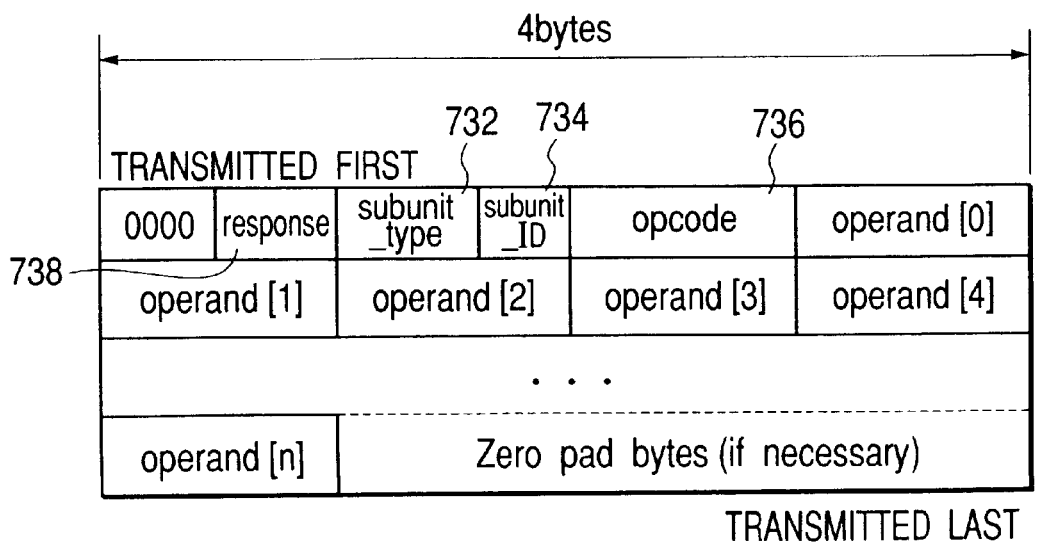

FIGS. 7A and 7B are diagrams showing the structures of a command frame and a response frame in conformity with the AV/C command set specifications. FIG. 7A shows the structure of a command frame and FIG. 7B shows the structure of a response frame.

In FIG. 7A, a field 730 (4 bits) indicates a command type (hereinafter called ctype 730), a field 732 (5 bits) indicates a subunit type (hereinafter called subunit_type), a field 734 indicates a subunit ID (hereinafter called subunit_ID), and a field 736 indicates an opcode (hereinafter called opcode 736). In field following the field 736, operand[0], operand[1], . . . , operand[n] are stored in each byte.

ctype 730 of the field will be first described. FIG. 8 is a diagram showing an example of the relation between the value of the field 730 and the command type (ctype 730).

In FIG. 8, if ctype 730 is "CONTROL, the target is controlled by the controller. The control contents are designated by the opcode 736 and operand[0] to operand[n] to be described later. A command frame whose ctype 730 designates "CONTROL" is hereinafter called a CONTROL command.

If ctype 730 is "STATUS", the target recognizes that an inquiry for a current status is received. The subject status is designated by opcode 736 and operand[0] to operand[n] to be described later. A command frame whose ctype 730 designates "STATUS" is hereinafter called a STATUS command.

If ctype 730 is "NOTIFY", the target notifies the controller of a change in its own status. The subject status is designated by opcode 736 and operand[0] to operand[n] to be described later. A command frame whose ctype 730 designates "NOTIFY" is hereinafter called a NOTIFY command.

If ctype 730 is "SPECIFIC INQUIRY" or "GENERAL INQUIRY", the target checks whether it has the CONTROL command having the same opcode 736. A command frame whose ctype 730 designates "SPECIFIC INQUIRY" is hereinafter called a SPECIFIC INQUIRY command, and a command frame whose ctype 730 designates "GENERAL INQUIRY" is hereinafter called a GENERAL INQUIRY command.

The SPECIFIC INQUIRY command is required to designate opcode 736 and all operand[0] to operand[n]. The GENERAL INQUIRY command designates only opcode 736.

Next, subunit_type of the field 732 and subunit_ID of the field 734 will be described.

The subunit as the transmission destination of a command frame is identified by subunit_type and subunit_ID. The subunit is defined by the AV/V command set specifications. According to the AV/C command set specifications, the subunit is a virtual entry capable of providing a consistent function set in one unit. The unit corresponding to an electronic apparatus having a 1394 interface.

According to the AV/C command set specifications, one unit can have a plurality of subunits. Therefore, subunit_type 732 and subunit_ID 734 in the command frame indicate an address for designating a subunit in some unit. The above-described subunit_type 732 and subunit_ID 734 are collectively called a "subunit address (or AV/C address)".

FIG. 9 shows an example of the relation between the value of the field 732 and subunit_type. For example, if the value of subunit_type 732 is "$1F_{16}$" and the value of subunit_ID 734 is "$3_{16}$", the subunit address does not indicate a specific subunit, but it indicates the unit itself.

For example, in this embodiment, when the computer 10 (controller) transmits a command frame to the digital TV 30 (target), the value of subunit_type 732 is "$00000_2$" and the value of subunit_ID 734 is "$000_2$".

Similarly, in this embodiment, when the computer 10 (controller) transmits a command frame to a video camera subunit of DVCR 56 (target), the value of subunit_type 732 is "$00111_2$" and the value of subunit_ID 734 is "$000_2$".

Similarly, in this embodiment, when the computer 10 (controller) transmits a command frame to a VCR subunit of DVCR 56 (target), the value of subunit_type 732 is "$00100_2$" and the value of subunit_ID 734 is "$000_2$".

Next, the opcode 736 of the field 736 and following operand[0] to operand[n] will be described.

The opcode 736 defines the control contents to be executed, a status to be returned by a response frame to be described later. The number of operand[0] to operand[n] and their contents become different depending upon the contents of ctype 730, subunit_type and opcode 736.

The structure and function of the response frame will be described with reference to FIG. 7B. In FIG. 7B, the fields having the same functions as the command frame shown in FIG. 7A are represented by using identical reference numerals, and the description thereof is omitted.

In FIG. 7B, a field 738 (4 bits) indicates a response type (hereinafter called a response). An example of the relation between the value of the field 738 and response is shown in FIG. 10.

A target subunit generates a proper response frame corresponding to the command frame transmitted from the controller, and transmits it to the controller. The contents of opcode 736 and the number of operand[0] to operand[n] and their contents become different depending upon the contents of subunit_type.

Next, the sequence of remotely controlling various functions of the digital TV 30 by the computer 10 by using CONTROL/STATUS commands defined in this embodiment, will be described. In this case, the computer 10 is the controller and the digital TV 30 is the target.

An example of the CONTROL/STATUS command defined by this embodiment will be described in detail. In this embodiment, an opcode 736 such as shown in FIG. 11 is newly defined.

In the embodiment, a command frame having the value of opcode 736 of "$40_{16}$" is called an "APERTURE command", a command frame having the value of opcode 736 of "$41_{16}$" is called a "BRIGHTNESS command", a command frame having the value of opcode 736 of "$42_{16}$" is called a "CHROMA command", a command frame having the value of opcode 736 of "$43_{16}$" is called a "CONTRAST command", a command frame having the value of opcode 736 of "$44_{16}$" is called a "PHASE command", and a command frame having the value of opcode 736 of "$70_{16}$" is called a "RANGE command".

(1-1) APERTURE Command

First, the function of the APERTURE command will be described.

The APERTURE command is a command for the control of, and the current status inquiry to, a contour adjustment function (i.e., resolution adjustment function) of the digital TV 30 operating as the target.

For the control of this contour adjustment function, the controller asynchronously transfers the APERTURE command having ctype 730 of "CONTROL" (hereinafter called an APERTURE CONTROL command) to the target. For the current status inquiry to the contour adjustment function, the controller asynchronously transfers the APERTURE command having ctype 730 of "STATUS" (hereinafter called an APERTURE STATUS command) to the target.

In this embodiment, the APERTURE CONTROL command adjusts the contour of an image to be output by the digital TV 30 by using at least one of operand[0] to operand[n]. For example, if the operand[0] is "$01_{16}$", the digital TV 30 increases the contour adjustment value by one level, whereas if the operand[0] is "$02_{16}$", the digital TV 30 decreases the contour adjustment value by one level. In this case, the change amount of one level may be changed for each target, or may be fixed for all targets.

If the operand[0] is a predetermined value (e.g., "$00_{16}$"), the digital TV 30 may set the contour adjustment value to a constant value (so-called default value) preset for the shipping of the apparatus from the factory.

The value of opcode 736 of the APERTURE command is not limited to "$40_{16}$" but it may be set to another value.

(1-2) BRIGHTNESS Command

Next, the function of the BRIGHTNESS command will be described.

The BRIGHTNESS command is a command for the control of, and the current status inquiry to, a brightness adjustment function of the digital TV 30 operating as the target.

For the control of this brightness adjustment function, the controller asynchronously transfers the BRIGHTNESS command having ctype 730 of "CONTROL" (hereinafter called a BRIGHTNESS CONTROL command) to the target.

For the current status inquiry to the brightness adjustment function, the controller asynchronously transfers the BRIGHTNESS command having ctype 730 of "STATUS" (hereinafter called a BRIGHTNESS STATUS command) to the target.

In this embodiment, the BRIGHTNESS CONTROL command adjusts the brightness of an image to be output by the digital TV 30 by using at least one of operand[0] to operand[n]. For example, if the operand[0] is "$01_{16}$", the digital TV 30 increases the brightness by one level, whereas if the operand[0] is "$02_{16}$", the digital TV 30 decreases the brightness by one level. In this case, the change amount of one level may be changed for each target, or may be fixed for all targets.

If the operand[0] is a predetermined value (e.g., "$00_{16}$"), the digital TV 30 may set the brightness adjustment value to a constant value (so-called default value) preset for the shipping of the apparatus from the factory.

The value of opcode 736 of the BRIGHTNESS command is not limited to "$41_{16}$" but it may be set to another value.

(1-3) CHROMA Command

The CHROMA command is a command for the control of, and the current status inquiry to, a color density adjustment function of the digital TV 30 operating as the target.

For the control of this color density adjustment function, the controller asynchronously transfers the CHROMA command having ctype 730 of "CONTROL" (hereinafter called a CHROMA CONTROL command) to the target. For the current status inquiry to the color density adjustment function, the controller asynchronously transfers the CHROMA command having ctype 730 of "STATUS" (hereinafter called a CHROMA STATUS command) to the target.

In this embodiment, the CHROMA CONTROL command adjusts the color density of an image to be output by the digital TV 30 by using at least one of operand[0] to operand[n]. For example, if the operand[0] is "$01_{16}$", the digital TV 30 increases the color density by one level, whereas if the operand[0] is "$02_{16}$", the digital TV 30 decreases the color density by one level. In this case, the change amount of one level may be changed for each target, or may be fixed for all targets.

If the operand[0] is a predetermined value (e.g., "$00_{16}$"), the digital TV 30 may set the color density adjustment value to a constant value (so-called default value) preset for the shipping of the apparatus from the factory.

The value of opcode 736 of the CHROMA command is not limited to "$42_{16}$" but it may be set to another value.

(1-4) CONTRAST Command

Next, the function of the CONTRAST command will be described.

The CONTRAST command is a command for the control of, and the current status inquiry to, a contrast adjustment function of the digital TV 30 operating as the target.

For the control of this contrast adjustment function, the controller asynchronously transfers the CONTRAST command having ctype 730 of "CONTROL" (hereinafter called a CONTRAST CONTROL command) to the target. For the current status inquiry to the contrast adjustment function, the controller asynchronously transfers the CONTRAST command having ctype 730 of "STATUS" (hereinafter called a CONTRAST STATUS command) to the target.

In this embodiment, the CONTRAST CONTROL command adjusts the contrast of an image to be output by the digital TV 30 by using at least one of operand[0] to operand[n]. For example, if the operand[0] is "$01_{16}$", the digital TV 30 increases the contrast by one level, whereas if the operand[0] is "$02_{16}$", the digital TV 30 decreases the contrast by one level. In this case, the change amount of one level may be changed for each target, or may be fixed for all targets.

If the operand[0] is a predetermined value (e.g., "$00_{16}$"), the digital TV 30 may set the contrast adjustment value to a constant value (so-called default value) preset for the shipping of the apparatus from the factory.

The value of opcode 736 of the CONTRAST command is not limited to "$43_{16}$" but it may be set to another value.

(1-5) PHASE Command

Next, the function of the PHASE command will be described.

The PHASE command is a command for the control of, and the current status inquiry to, a color adjustment function of the digital TV 30 operating as the target.

For the control of this color adjustment function, the controller asynchronously transfers the PHASE command having ctype 730 of "CONTROL" (hereinafter called a PHASE CONTROL command) to the target. For the current status inquiry to the color adjustment function, the controller asynchronously transfers the PHASE command having ctype 730 of "STATUS" (hereinafter called a PHASE STATUS command) to the target.

In this embodiment, the PHASE CONTROL command adjusts the color of an image to be output by the digital TV 30 by using at least one of operand[0] to operand[n]. For example, if the operand[0] is "$01_{16}$", the digital TV 30 enhances green color by one level, whereas if the operand[0] is "$02_{16}$", the digital TV 30 enhances purple color by one level. In this case, the change amount of one level may be changed for each target, or may be fixed for all targets.

If the operand[0] is a predetermined value (e.g., "$00_{16}$"), the digital TV 30 may set the hue adjustment value to a constant value (so-called default value) preset for the shipping of the apparatus from the factory.

The value of opcode 736 of the PHASE command is not limited to "$44_{16}$" but it may be set to another value.

(1-6) RANGE Command

Next, the function of the RANGE command will be described.

The RANGE command is a status command for inquiring the display TV 30 operating as the target as to the control parameter (i.e., present set value, operable range) of each function to be remotely controlled by the APERTURE, BRIGHTNESS, CHROMA, CONTRAST and PHASE commands described above.

By inquiring the control parameter of each command by using the RANGE command, the adjustable range of each of various image quality adjustment functions of the digital TV 30 can be known easily and efficiently. The value representative of "STATUS" is stored in ctype 730 of the RANGE command (hereinafter called a RANGE STATUS command).

FIG. 12 is a diagram showing an example of the structure of the RANGE STATUS command.

In FIG. 12, a value "$70_{16}$" representative of the RANGE command is set to opcode 736. A value designating a desired function is set to operand[0] which is a range_mode field. For example, "$40_{16}$" is set if an operable range of the contour adjustment function is inquired, and "$41_{16}$" is set if the operable range of the brightness adjustment function is inquired. "$42_{16}$" is set if an operable range of the color density adjustment function is inquired, and "$43_{16}$" is set if the operable range of the contrast adjustment function is inquired. "$44_{16}$" is set if the operable range of the color adjustment function is inquired. A dummy byte "$FF_{16}$" is set to operand[1] and operand[2]. The dummy byte is not limited to "$FF_{16}$", but it may be "$7F_{16}$," "$3F_{16}$," "$1F_{16}$, or the like.

Next, the function of the RANGE STATUS response will be described. The RANGE STATUS response is a response frame corresponding to the RANGE STATUS command.

FIG. 13 is a diagram showing an example of the structure of the RANGE STATUS response. In FIG. 13, a value corresponding to the RANGE command, i.e., "$70_{16}$", is set to opcode 736. A value corresponding to operand[0] of the RANGE command is stored in operand[0] which is the range_mode field. A minimum value of the operable range is stored in operand[1] which is a minimum_value field. A maximum value of the operable range is stored in operand [2] which is a maximum_value field.

For example, a value representative of the number of levels relative to a default value is stored in the minimum_ value and maximum_value fields. For example, if the maximum value of the operable range is at the fifth level higher than the default value and the minimum value is at the sixth level lower than the default value, then "$06_{16}$" is stored in the minimum_value field and "$05_{16}$" is stored in the maximum_value field.

Figure 14:
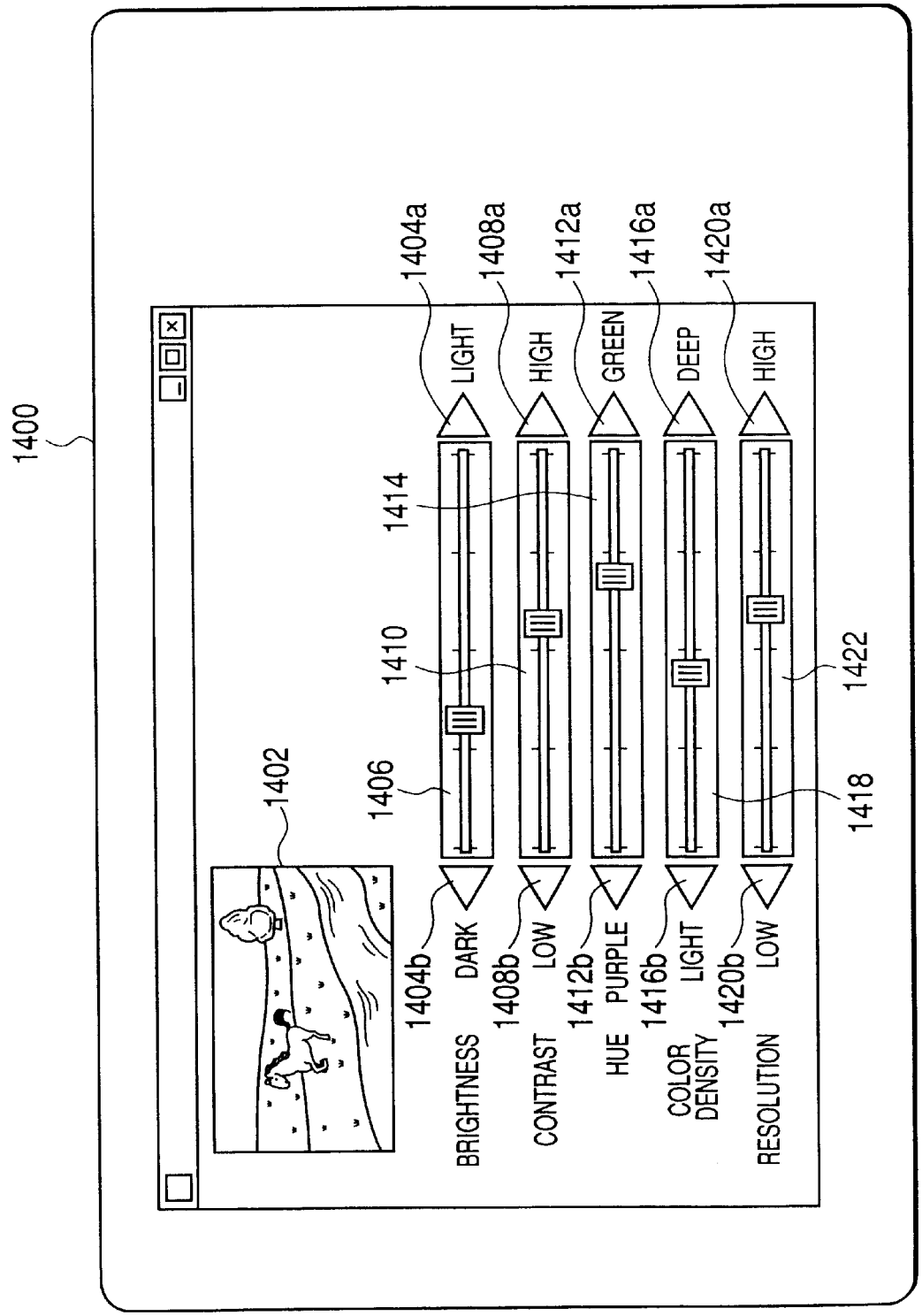
FIG. 14 is a diagram showing an example of a graphical user interface (GUI) of this embodiment.

Next, an image quality setting application (hereinafter simply called application) of this embodiment will be described. FIG. 14 is a diagram showing an example of a graphical user interface (hereinafter called GUI) configured by the application of this embodiment. This application is initiated by the computer 10 which serves as the controller.

In FIG. 14, reference numeral 1400 represents a monitor screen of the computer 10 serving as the controller. Reference numeral 1402 represents a preview screen for a digital image isochronously transferred from the digital TV 30 serving as the target.

Reference numeral 1404 represents an adjustment button for adjusting the brightness of the digital image displayed on the preview screen 1402. Reference numeral 1404a represents an adjustment button for increasing the brightness, and reference numeral 1404b represents an adjustment button for reducing the brightness. Reference numeral 1406 represents an indicator for indicating the present brightness level and the operable range.

Reference numeral 1408 represents an adjustment button for adjusting the contrast of the digital image displayed on the preview screen 1402. Reference numeral 1408a represents an adjustment button for increasing the contrast, and reference numeral 1408b represents an adjustment button for reducing the contrast. Reference numeral 1410 represents an indicator for indicating the present contrast level and the operable range.

Reference numeral 1412 represents an adjustment button for adjusting the color of the digital image displayed on the preview screen 1402. Reference numeral 1412a represents an adjustment button for enhancing green color, and reference numeral 1412b represents an adjustment button for enhancing purple color. Reference numeral 1414 represents an indicator for indicating the present color level and the operable range.

Reference numeral 1416 represents an adjustment button for adjusting the color density of the digital image displayed on the preview screen 1402. Reference numeral 1416a represents an adjustment button for increasing the color density, and reference numeral 1416b represents an adjustment button for reducing the color density. Reference numeral 1418 represents an indicator for indicating the present color density level and the operable range.

Reference numeral 1420 represents an adjustment button for adjusting the resolution of the digital image displayed on the preview screen 1402. Reference numeral 1420a represents an adjustment button for raising the resolution, and reference numeral 1420b represents an adjustment button for lowering the resolution. Reference numeral 1422 represents an indicator for indicating the present resolution level and the operable range.

Next, the sequence of adjusting the image quality of the digital image by remotely controlling the functions of the digital TV 30 serving as the target by the computer 10 serving as the controller, the digital image being isochronously transferred from the digital TV 30 to DVCR 56 and computer 10.

(2-1) Remote Control of Brightness

First, with reference to FIG. 15, a process of remotely controlling the brightness adjustment function will be described.

Figure 15:
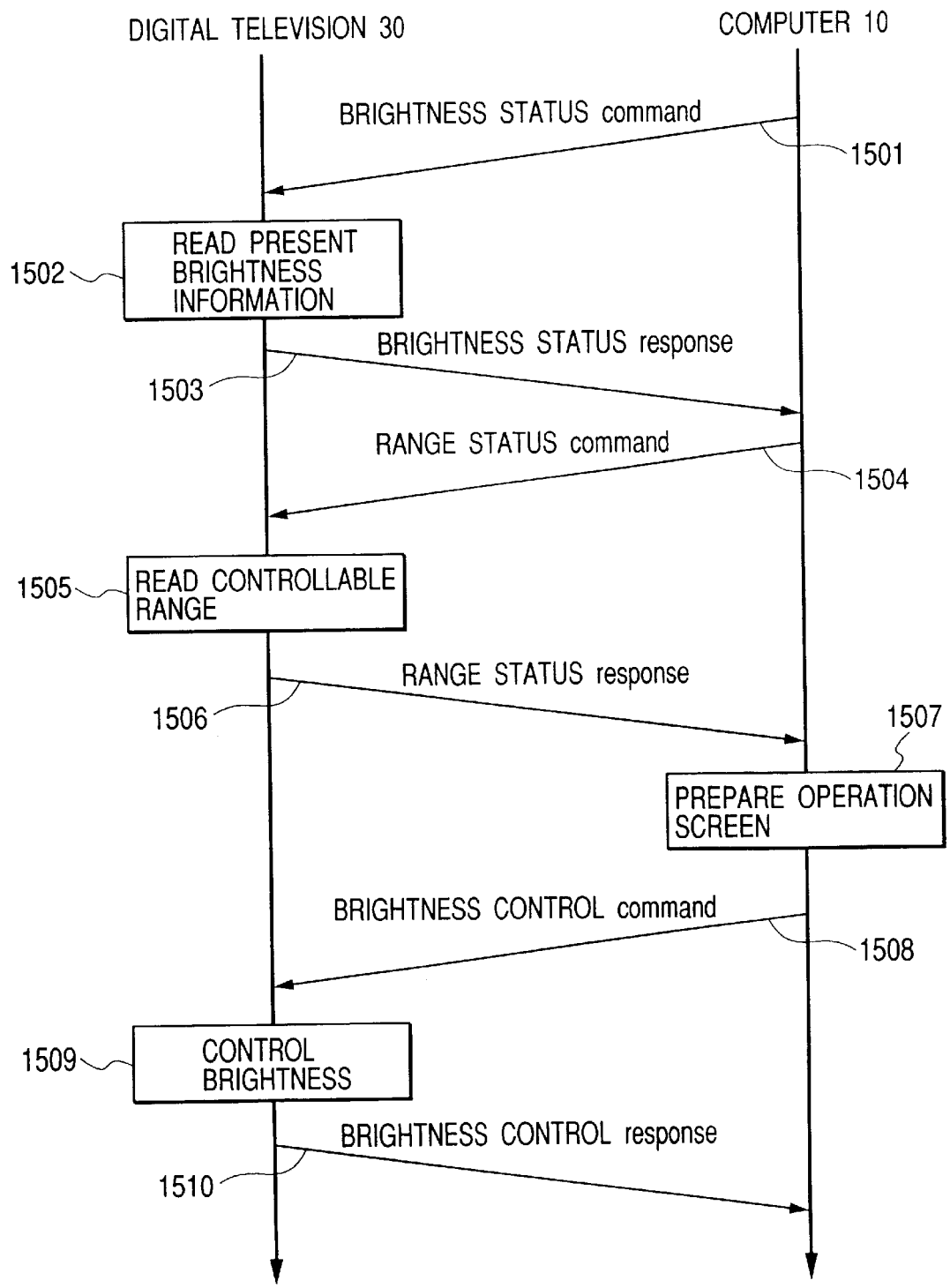
FIG. 15 is a diagram illustrating a procedure of remotely controlling each function of a digital television.

The application transmits the BRIGHTNESS STATUS command to the digital TV 30, and acquires from the response to the command the brightness information of the digital image which the digital TV 30 isochronously transmits presently (1501 to 1503 in FIG. 15).

Thereafter, the application transmits the RANGE STATUS command which stores the value (i.e., "$41_{16}$") representative of "BRIGHTNESS" in the range_mode field (1504 in FIG. 15).

Upon reception of the RANGE STATUS command, the digital TV 30 detects the operable range of its brightness adjustment function (1505 in FIG. 15). The detected result is set to the RANGE STATUS response which is in turn asynchronously transferred to the computer 10 (1506 in FIG. 15).

The application recognizes from the RANGE STATUS response the present set value, and the upper and lower limits of the operable range. By using these values, the application generates the brightness adjustment indicator 1406 shown in FIG. 14 and displays it (1507 in FIG. 15).

When the brightness adjustment button 1404a is depressed, the application controls the digital TV 30 to increase the brightness of the digital image under isochronous transfer by the digital TV 30 by one level. At this time, the application generates the BRIGHTNESS CONTROL command having "$01_{16}$" set to operand[0] and asynchronously transfers it to the digital TV 30 (1508 in FIG. 15).

On the other hand, when the brightness adjustment button 1404b is depressed, the application controls the digital TV 30 to decrease the brightness of the digital image under isochronous transfer by the digital TV 30 by one level. At this time, the application generates the BRIGHTNESS CONTROL command having "$02_{16}$" set to operand[0] and asynchronously transfers it to the digital TV 30 (1508 in FIG. 15).

After the BRIGHTNESS CONTROL command is received, the digital TV 30 adjusts the brightness of the digital image under isochronous transfer, and asynchronously transfers the BRIGHTNESS CONTROL response to the computer 10 (1509, 1510 in FIG. 15).

(2-2) Remote Control of Contrast

Next, with reference to FIG. 15, a process of remotely controlling the contrast adjustment function will be described. The contrast adjustment function can be processed in the manner similar to the brightness control process.

The application transmits the CONTRAST STATUS command to the digital TV 30, and acquires from the response to the command the contrast information of the digital image which the digital TV 30 isochronously transmits presently (1501 to 1503 in FIG. 15).

Thereafter, the application transmits the RANGE STATUS command which stores the value (i.e., "$43_{16}$") representative of "CONTRAST" in the range_mode field (1504 in FIG. 15). The application recognizes from the response to this command the present set value, and the upper and lower limits of the controllable range (1505, 1506 in FIG. 15). By using these values, the application generates the contrast adjustment indicator 1410 shown in FIG. 14 and displays it (1507 in FIG. 15).

When the contrast adjustment button 1408a is depressed, the application controls the digital TV 30 to increase the contrast of the digital image under isochronous transfer by the digital TV 30 by one level. At this time, the application generates the CONTRAST CONTROL command having "$01_{16}$" set to operand[0] and asynchronously transfers it to the digital TV 30 (1508 in FIG. 15).

On the other hand, when the contrast adjustment button 1408b is depressed, the application controls the digital TV 30 to decrease the brightness of the digital image under isochronous transfer by the digital TV 30 by one level. At this time, the application generates the CONTRAST CONTROL command having "$02_{16}$" set to operand[0] and asynchronously transfers it to the digital TV 30 (1508 in FIG. 15).

After the CONTRAST CONTROL command is received, the digital TV 30 adjusts the contrast of the digital image under isochronous transfer, and asynchronously transfers the CONTRAST CONTROL response to the computer 10 (1509, 1510 in FIG. 15).

(2-3) Remote Control of Color

Next, with reference to FIG. 15, a process of remotely controlling the color adjustment function will be described. The color adjustment function can be processed in the manner similar to the brightness control process.

The application transmits the PHASE STATUS command to the digital TV 30, and acquires from the response to the command the color information of the digital image which the digital TV 30 isochronously transmits presently (1501 to 1503 in FIG. 15).

Thereafter, the application transmits the RANGE STATUS command which stores the value (i.e., "$44_{16}$") representative of "PHASE" in the range_mode field (1504 in FIG. 15). The application recognizes from the response to the command the present set value, and the upper and lower limits of the controllable range (1505, 1506 in FIG. 15). By using these values, the application generates the color adjustment indicator 1414 shown in FIG. 14 and displays it (1507 in FIG. 15).

When the color adjustment button 1412a is depressed, the application controls the digital TV 30 to enhance green color of the digital image under isochronous transfer by the digital TV 30 by one level. At this time, the application generates the PHASE CONTROL command having "$01_{16}$" set to operand[0] and asynchronously transfers it to the digital TV 30 (1508 in FIG. 15).

On the other hand, when the color adjustment button 1412b is depressed, the application controls the digital TV 30 to enhance purple color of the digital image under isochronous transfer by the digital TV 30 by one level. At this time, the application generates the PHASE CONTROL command having "$02_{16}$" set to operand[0] and asynchronously transfers it to the digital TV 30 (1508 in FIG. 15).

After the PHASE CONTROL command is received, the digital TV 30 adjusts the color of the digital image under isochronous transfer, and asynchronously transfers the PHASE CONTROL response to the computer 10 (1509, 1510 in FIG. 15).

(2-4) Remote Control of Color Density

Next, with reference to FIG. 15, a process of remotely controlling the color density adjustment function will be described. The color density adjustment function can be processed in the manner similar to the brightness control process.

The application transmits the CHROMA STATUS command to the digital TV 30, and acquires from the response to the command the color density information of the digital image which the digital TV 30 isochronously transmits presently (1501 to 1503 in FIG. 15).

Thereafter, the application transmits the RANGE STATUS command which stores the value (i.e., "$42_{16}$") representative of "CHROMA" in the range_mode field (1504 in FIG. 15). The application recognizes from the response to the command the present set value, and the upper and lower limits of the controllable range (1505, 1506 in FIG. 15). By using these values, the application generates the color adjustment indicator 1418 shown in FIG. 14 and displays it (1507 in FIG. 15).

When the color density adjustment button 1416a is depressed, the application controls the digital TV 30 to increase the color density of the digital image under isochronous transfer by the digital TV 30 by one level. At this time, the application generates the CHROMA CONTROL command having $01_{16}$" set to operand[0] and asynchronously transfers it to the digital TV 30 (1508 in FIG. 15).

On the other hand, when the color density adjustment button 1416b is depressed, the application controls the digital TV 30 to decrease the color density of the digital image under isochronous transfer by the digital TV 30 by one level. At this time, the application generates the CHROMA CONTROL command having "$02_{16}$" set to operand[0] and asynchronously transfers it to the digital TV 30 (1508 in FIG. 15).

After the CHROMA CONTROL command is received, the digital TV 30 adjusts the color density of the digital image under isochronous transfer, and asynchronously transfers the CHROMA CONTROL response to the computer 10 (1509, 1510 in FIG. 15).

(2-5) Remote Control of Resolution

Next, with reference to FIG. 15, a process of remotely controlling the resolution adjustment function will be described. The resolution adjustment function can be processed in the manner similar to the brightness control process.

The application transmits the APERTURE STATUS command to the digital TV 30, and acquires from the response to the command the resolution information of the digital image which the digital TV 30 isochronously transmits presently (1501 to 1503 in FIG. 15).

Thereafter, the application transmits the RANGE STATUS command which stores the value (i.e., "$42_{16}$") representative of "APERTURE" in the range_mode field (1504 in FIG. 15). The application recognizes from the response to the command the present set value, and the upper and lower limits of the controllable range (1505, 1506 in FIG. 15). By using these values, the application generates the resolution adjustment indicator 1422 shown in FIG. 14 and displays it (1507 in FIG. 15).

When the resolution adjustment button 1420a is depressed, the application controls the digital TV 30 to raise the resolution of the digital image under isochronous transfer by the digital TV 30 by one level. At this time, the application generates the APERTURE CONTROL command having "$01_{16}$" set to operand[0] and asynchronously transfers it to the digital TV 30 (1508 in FIG. 15).

On the other hand, when the resolution adjustment button 1420b is depressed, the application controls the digital TV 30 to lower the resolution of the digital image under isochronous transfer by the digital TV 30 by one level. At this time, the application generates the APERTURE CONTROL command having "$02_{16}$" set to operand[0] and asynchronously transfers it to the digital TV 30 (1508 in FIG. 15).

After the APERTURE CONTROL command is received, the digital TV 30 adjusts the resolution of the digital image under isochronous transfer, and asynchronously transfers the APERTURE CONTROL response to the computer 10 (1509, 1510 in FIG. 15).

With the processes (2-1) to (2-5), the application of this embodiment can inquire the present set value and the upper and lower limits of the controllable range of each function of the digital TV 30, and these values can be reflected upon a plurality of GUIs (i.e., indicators 1406, 1410, 1414, 1418, 1422). Accordingly, the application of this embodiment allows the user to very easily recognize the present status and controllable range of the brightness, contrast, color, color density and resolution of the digital image under isochronous transfer by the digital TV 30.

Furthermore, it is possible to change in real time the brightness, contrast, color, color density and resolution of the digital image under isochronous transfer by the digital TV 30, by directly operating upon the indicators while looking at the digital image.

Next, the process of forming and displaying the indicators 1406, 1410, 1414, 1418 and 1422 by the application of this embodiment will be described specifically. In the following, the process of forming and displaying the brightness adjustment indicator 1406 will be described by way of example.

For example, when the BRIGHTNESS STATUS response such as shown in FIG. 16 is received at 1503 shown in FIG. 15 and the RANGE STATUS response such as shown in FIG. 17 is received at 1506 shown in FIG. 15, the application forms the indicator shown in FIG. 20A in accordance with the following processes (1) to (3).

(1) The value of operand[0] of the BRIGHTNESS STATUS response is read to recognize the present level. If the operand[0] is "$00_{16}$", it indicates that the present level takes the default value.

(2) The minimum_value and maximum_value fields of the RANGE STATUS response are read to recognize the controllable range. If the minimum_value field is "$03_{16}$" and the maximum_value field is "$05_{16}$", it means that there are three levels in the dark direction from the default value and five levels in the bright direction from the default value.

(3) By using the results of (1) and (2), the indicator, which indicates the present level and the controllable range from the lower limit to upper limit, is formed and displayed.

Also, for example, when the BRIGHTNESS STATUS response such as shown in FIG. 18 is received at 1503 shown in FIG. 15 and the RANGE STATUS response such as shown in FIG. 19 is received at 1506 shown in FIG. 15, the application forms the indicator shown in FIG. 20B in accordance with the following processes (4) to (6).

(4) The value of operand[0] of the BRIGHTNESS STATUS response is read to recognize the present level. If the operand[0] is "$02_{16}$", it indicates that the present level is the second level in the bright direction from the default value.

(5) The minimum_value and maximum_value fields of the RANGE STATUS response are read to recognize the controllable range. If the minimum_value field is "$06_{16}$" and the maximum_value field is "$0A_{16}$", it means that there are six levels in the dark direction from the default value and ten levels in the bright direction from the default value.

(6) By using the results of (4) and (5), the indicator, which indicates the present level and the controllable range from the lower limit to upper limit, is formed and displayed.

With the above processes, the indicators 1406, 1410, 1414, 1418 and 1422 can be formed and displayed.

The indicator can show the present level and the controllable range from the upper limit to the lower limit, which are easy to visually recognize and improve the user operability considerably.

Next, the sequence of remotely controlling various functions of DVCR 56 by the computer 10 by using CONTROL/STATUS commands defined in this embodiment, will be described. In this case, the computer 10 is the controller and the camera subunit of DVCR 56 is the target.

Another example of the CONTROL/STATUS command defined by this embodiment will be described in detail. In this embodiment, an opcode 736 such as shown in FIG. 21 is newly defined.

In the embodiment, a command frame having the value of opcode 736 of "$55_{16}$" is called a "CONTRAST command", a command frame having the value of opcode 736 of "$52_{16}$" is called a "GAMMA command", a command frame having the value of opcode 736 of "$5C_{16}$" is called a "HUE command", a command frame having the value of opcode 736 of "$5B_{16}$" is called a "SATURATION command", a command frame having the value of opcode 736 of "$54_{16}$" is called a "SETUP LEVEL command", a command frame having the value of opcode 736 of "$56_{16}$" is called a "SHARPNESS command", a command frame having the value of opcode 736 of "$70_{16}$" is called a "RANGE command", a command frame having the value of opcode 736 of "$43_{16}$" is called an "IRIS command", and a command frame having the value of opcode 736 of "$75_{16}$" is called an "IRIS RANGE command".

(3-1) CONTRAST Command

First, the function of the CONTRAST command will be described.

The CONTRAST command is a command for the control of, and the current status inquiry to, a contrast adjustment function of the camera subunit operating as the target.

For the control of this contrast adjustment function, the controller asynchronously transfers the CONTRAST command having ctype 730 of "CONTROL" (hereinafter called a CONTRAST CONTROL command) to the target. For the current status inquiry to the contrast adjustment function, the controller asynchronously transfers the CONTRAST command having ctype 730 of "STATUS" (hereinafter called a CONTRAST STATUS command) to the target.

In this embodiment, the CONTRAST CONTROL command adjusts the contrast of a digital image to be output by the camera subunit by using at least one of operand[0] to operand[n]. For example, if the operand[0] is "$01_{16}$", the camera subunit increases the contrast adjustment value by one level, whereas if the operand[0] is "$02_{16}$", the camera subunit decreases the contrast adjustment value by one level. In this case, the change amount of one level may be changed for each target, or may be fixed for all targets.

If the operand[0] is a predetermined value (e.g., "$00_{16}$"), the camera subunit may set the contrast adjustment value to a constant value (so-called default value) preset for the shipping of the apparatus from the factory.

The value of opcode 736 of the CONTRAST command is not limited to "$55_{16}$" but it may be set to another value.

(3-2) GAMMA Command

Next, the function of the GAMMA command will be described.

The GAMMA command is a command for the control of, and the current status inquiry to, a gamma adjustment function of the camera subunit operating as the target.

For the control of this gamma adjustment function, the controller asynchronously transfers the GAMMA command having ctype 730 of "CONTROL" (hereinafter called a GAMMA CONTROL command) to the target. For the current status inquiry to the gamma adjustment function, the controller asynchronously transfers the GAMMA command having ctype 730 of "STATUS" (hereinafter called a GAMMA STATUS command) to the target.

In this embodiment, the GAMMA CONTROL command adjusts the gamma value of a digital image to be output by the camera subunit by using at least one of operand[0] to operand[n]. For example, if the operand[0] is "$01_{16}$", the camera subunit increases the gamma value by one level, whereas if the operand[0] is "$02_{16}$", the camera subunit decreases the gamma value by one level. In this case, the change amount of one level may be changed for each target, or may be fixed for all targets.

If the operand[0] is a predetermined value (e.g., "$00_{16}$"), the camera subunit may set the gamma value to a constant value (so-called default value) preset for the shipping of the apparatus from the factory.

The value of opcode 736 of the GAMMA command is not limited to "$52_{16}$" but it may be set to another value.

(3-3) HUE Command

Next, the function of the HUE command will be described.

The HUE command is a command for the control of, and the current status inquiry to, a hue adjustment function of the camera subunit operating as the target.

For the control of this hue adjustment function, the controller asynchronously transfers the HUE command having ctype 730 of "CONTROL" (hereinafter called a HUE CONTROL command) to the target. For the current status inquiry to the hue adjustment function, the controller asynchronously transfers the HUE command having ctype 730 of "STATUS" (hereinafter called a HUE STATUS command) to the target.

In this embodiment, the HUE CONTROL command adjusts the hue of a digital image to be output by the camera subunit by using at least one of operand[0] to operand[n]. For example, if the operand[0] is "$01_{16}$", the camera subunit increases the hue by one level, whereas if the operand[0] is "$02_{16}$", the camera subunit decreases the hue by one level. In this case, the change amount of one level may be changed for each target, or may be fixed for all targets.

If the operand[0] is a predetermined value (e.g., "$00_{16}$"), the camera subunit may set the hue to a constant value (so-called default value) preset for the shipping of the apparatus from the factory.

The value of opcode 736 of the HUE command is not limited to "$5C_{16}$" but it may be set to another value.

(3-4) SATURATION Command

Next, the function of the SATURATION command will be described.

The SATURATION command is a command for the control of, and the current status inquiry to, a saturation adjustment function of the camera subunit operating as the target.

For the control of this saturation adjustment function, the controller asynchronously transfers the SATURATION command having ctype 730 of "CONTROL" (hereinafter called a SATURATION CONTROL command) to the target. For the current status inquiry to the saturation adjustment function, the controller asynchronously transfers the SATURATION command having ctype 730 of "STATUS" (hereinafter called a SATURATION STATUS command) to the target.

In this embodiment, the SATURATION CONTROL command adjusts the saturation of a digital image to be output by the camera subunit by using at least one of operand[0] to operand[n]. For example, if the operand[0] is "$01_{16}$", the camera subunit increases the saturation by one level, whereas if the operand[0] is "$02_{16}$", the camera subunit decreases the saturation by one level. In this case, the change amount of one level may be changed for each target, or may be fixed for all targets.

If the operand[0] is a predetermined value (e.g., "$00_{16}$"), the camera subunit may set the saturation to a constant value (so-called default value) preset for the shipping of the apparatus from the factory.

The value of opcode 736 of the SATURATION command is not limited to "$5B_{16}$" but it may be set to another value.

(3-5) SETUP LEVEL Command

Next, the function of the SETUP LEVEL command will be described.

The SETUP LEVEL command is a command for the control of, and the current status inquiry to, a setup level adjustment function of the camera subunit operating as the target.

For the control of this setup level adjustment function, the controller asynchronously transfers the SETUP LEVEL command having ctype 730 of "CONTROL" (hereinafter called a SETUP LEVEL CONTROL command) to the target. For the current status inquiry to the setup level adjustment function, the controller asynchronously transfers the SETUP LEVEL command having ctype 730 of "STATUS" (hereinafter called a SETUP LEVEL STATUS command) to the target.

In this embodiment, the SETUP LEVEL CONTROL command adjusts the setup level of a digital image to be output by the camera subunit by using at least one of operand[0] to operand[n]. For example, if the operand[0] is "$01_{16}$", the camera subunit increases the setup level by one level, whereas if the operand[0] is "$02_{16}$", the camera subunit decreases the setup level by one level. In this case, the change amount of one level may be changed for each target, or may be fixed for all targets.

If the operand[0] is a predetermined value (e.g., "$00_{16}$"), the camera subunit may set the setup level to a constant value (so-called default value) preset for the shipping of the apparatus from the factory.

The value of opcode 736 of the SETUP LEVEL command is not limited to "$54_{16}$" but it may be set to another value.

(3-6) SHARPNESS Command

Next, the function of the SHARPNESS command will be described.

The SHARPNESS command is a command for the control of, and the current status inquiry to, a sharpness adjustment function of the camera subunit operating as the target.

For the control of this sharpness adjustment function, the controller asynchronously transfers the SHARPNESS command having ctype 730 of "CONTROL" (hereinafter called a SHARPNESS CONTROL command) to the target. For the current status inquiry to the sharpness adjustment function, the controller asynchronously transfers the SHARPNESS command having ctype 730 of "STATUS" (hereinafter called a SHARPNESS STATUS command) to the target.

In this embodiment, the SHARPNESS CONTROL command adjusts the sharpness of a digital image to be output by the camera subunit by using at least one of operand[0] to operand[n]. For example, if the operand[0] is "$01_{16}$", the camera subunit increases the sharpness by one level, whereas if the operand[0] is "$02_{16}$", the camera subunit decreases the sharpness by one level. In this case, the change amount of one level may be changed for each target, or may be fixed for all targets.

If the operand[0] is a predetermined value (e.g., "$00_{16}$"), the camera subunit may set the sharpness to a constant value (so-called default value) preset for the shipping of the apparatus from the factory.

The value of opcode 736 of the SHARPNESS command is not limited to "$56_{16}$" but it may be set to another value.

(3-7) RANGE Command

Next, the function of the RANGE command will be described.

The RANGE command is a status command for inquiring the camera subunit operating as the target as to the control parameter (i.e., present set value, operable range) of each function to be remotely controlled by the CONTRAST, GAMMA, HUE, SATURATION, SETUP LEVEL AND SHARPNESS commands described above.

This RANGE command has a function similar to the RANGE command described at (1-6). An example of the RANGE STATUS command is shown in FIG. 12. An example of the RANGE STATUS response is shown in FIG. 13.

(3-8) IRIS Command

Next, the function of the IRIS command will be described.

The IRIS command is a command for the control of, and the current status inquiry to, an iris adjustment function of the camera subunit operating as the target.

For the control of this iris adjustment function, the controller asynchronously transfers the IRIS command having ctype 730 of "CONTROL" (hereinafter called an IRIS CONTROL command) to the target. For the current status inquiry to the iris adjustment function, the controller asynchronously transfers the IRIS command having ctype 730 of "STATUS" (hereinafter called an IRIS STATUS command) to the target.

In this embodiment, the IRIS CONTROL command adjusts the iris of the camera subunit by using at least one of operand[0] to operand[n]. For example, if the operand[0] is "$01_{16}$", the camera subunit closes the iris by one level to increase an aperture ratio, whereas if the operand[0] is "$02_{16}$", the camera subunit opens the iris by one level to decrease the aperture ratio. In this case, the change amount of one level may be changed for each target, or may be fixed for all targets.

If the operand[0] is a predetermined value (e.g., "$00_{16}$"), the camera subunit may set the iris to a constant value (so-called default value) preset for the shipping of the apparatus from the factory.

The value of opcode 736 of the IRIS command is not limited to "$43_{16}$" but it may be set to another value.

(3-9) IRIS RANGE Command

Next, the function of the IRIS RANGE command will be described.

The IRIS RANGE command is a status command for inquiring the camera subunit operating as the target as to the control parameter (i.e., present set value, operable range) of the aperture ratio (F. No: f-number) to be remotely controlled by the IRIS command.

FIG. 22 is a diagram showing an example of the structure of the IRIS RANGE STATUS command. In FIG. 22, a value "$75_{16}$" representative of the IRIS RANGE command is stored in opcode 736. A dummy byte "$FF_{1616}$" is set to operand[0] and operand[1]. The dummy byte is not limited to "$FF_{16}$", but it may be "$7F_{16}$", "$3F_{16}$," "$1F_{16}$", or the like.

Next, the function of the IRIS RANGE STATUS response will be described. The IRIS RANGE STATUS response is a response frame corresponding to the IRIS RANGE STATUS command.

FIG. 23 is a diagram showing an example of the structure of the IRIS RANGE STATUS response. In FIG. 23, a value corresponding to the IRIS RANGE command, i.e., "$75_{16}$", is set to opcode 736. A minimum value of a settable aperture ratio (i.e., aperture ratio of an optical system in a full-open state) is set to operand[0] which is an open_f_number field. A maximum value of a settable aperture ratio is set to operand[1] which is a maximum_f_number field.

The relation between the value f and the aperture ratio F. No set to the open_f_number and maximum_f_number is given, for example, by the following equation.

$$F.\ No = \sqrt{2}^{(f/16)}$$

The relation between the value f and the aperture ratio F. No is not limited to the above equation, but other equations may also be used.

By using the above-described CONTROL/STATUS command, the controller can remotely control the contrast, gamma, hue, saturation, setup level and sharpness of an image picked up with DVCR 56, and can inquire the present set value and controllable range of each function. The iris of the optical system of DVCR 56 can be remotely controlled and the present set value and operable range can be inquired.

Next, an example of GUI formed by the application of this embodiment will be described with reference to FIG. 24. This application is initiated by the computer 10 operating as the controller.

Figure 24:
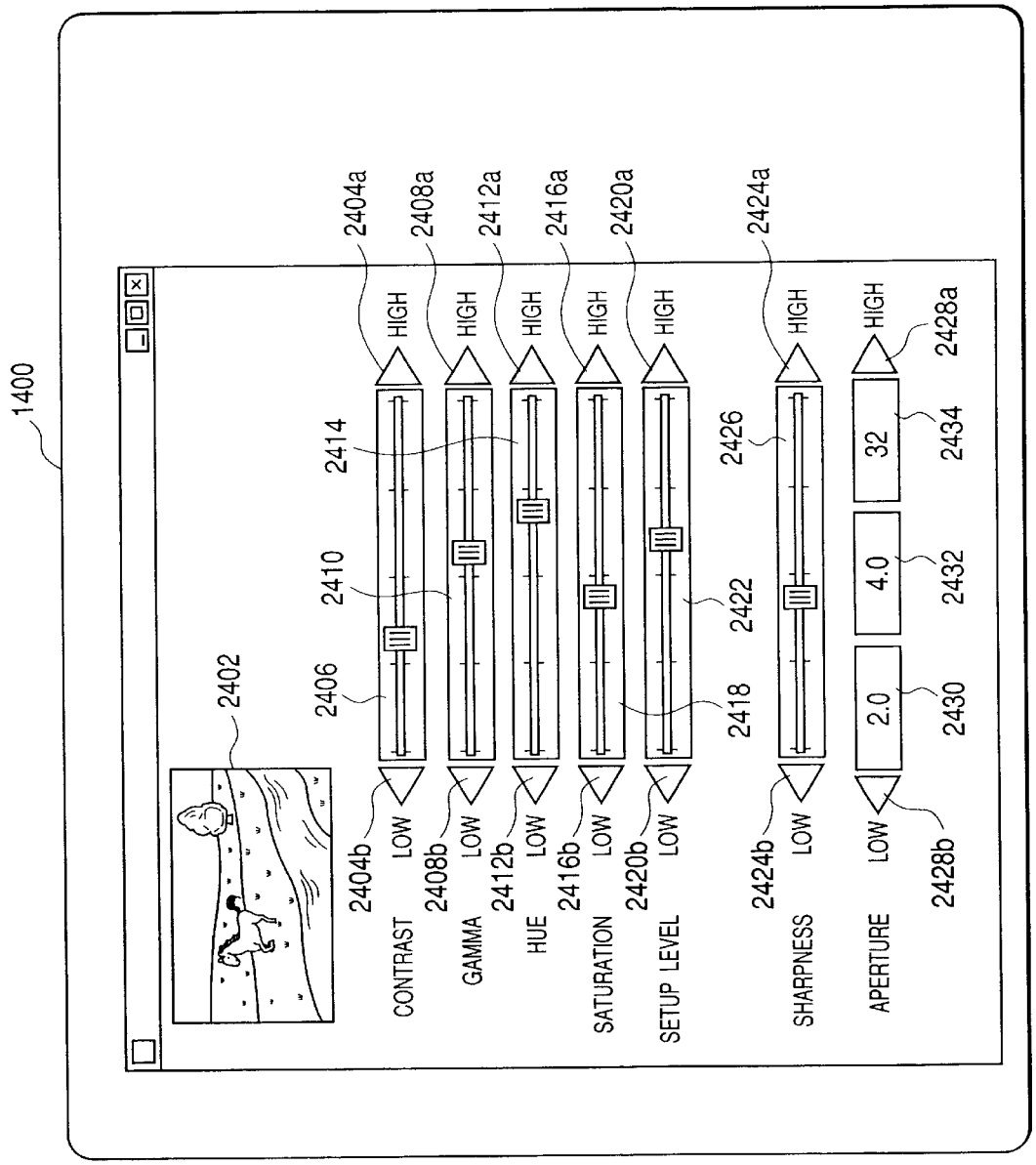
FIG. 24 is a diagram showing another example of GUI of this embodiment.

In FIG. 24, reference numeral 2402 represents a monitor screen for previewing a digital image under isochronous transfer by the camera subunit operating as the target.

Reference numerals 2404a and 2404b represent adjustment buttons for adjusting the contrast of a digital image displayed on the preview screen 2402. Reference numerals 2408a and 2408b represent adjustment buttons for adjusting the gamma value of the digital image displayed on the preview screen 2402. Reference numerals 2412a and 2412b represent adjustment buttons for adjusting the hue of the digital image displayed on the preview screen 2402. Reference numerals 2416a and 2416b represent adjustment buttons for adjusting the saturation of the digital image displayed on the preview screen 2402. Reference numerals 2420a and 2420b represent adjustment buttons for adjusting the setup level of the digital image displayed on the preview screen 2402. Reference numerals 2424a and 2424b represent adjustment buttons for adjusting the sharpness of the digital image displayed on the preview screen 2402. Reference numerals 2406, 2410, 2414, 2418, 2422 and 2426 represent indicators for indicating present set values and operable ranges.

Reference numerals 2428a and 2428b represent adjustment buttons for adjusting the iris of the camera subunit. Reference numeral 2430 represents an indicator for indicating the minimum F. No., reference numeral 2432 represents an indicator for indicating the present F. No., and reference numeral 2434 represents an indicator for indicating a maximum F. No.

Figure 25:
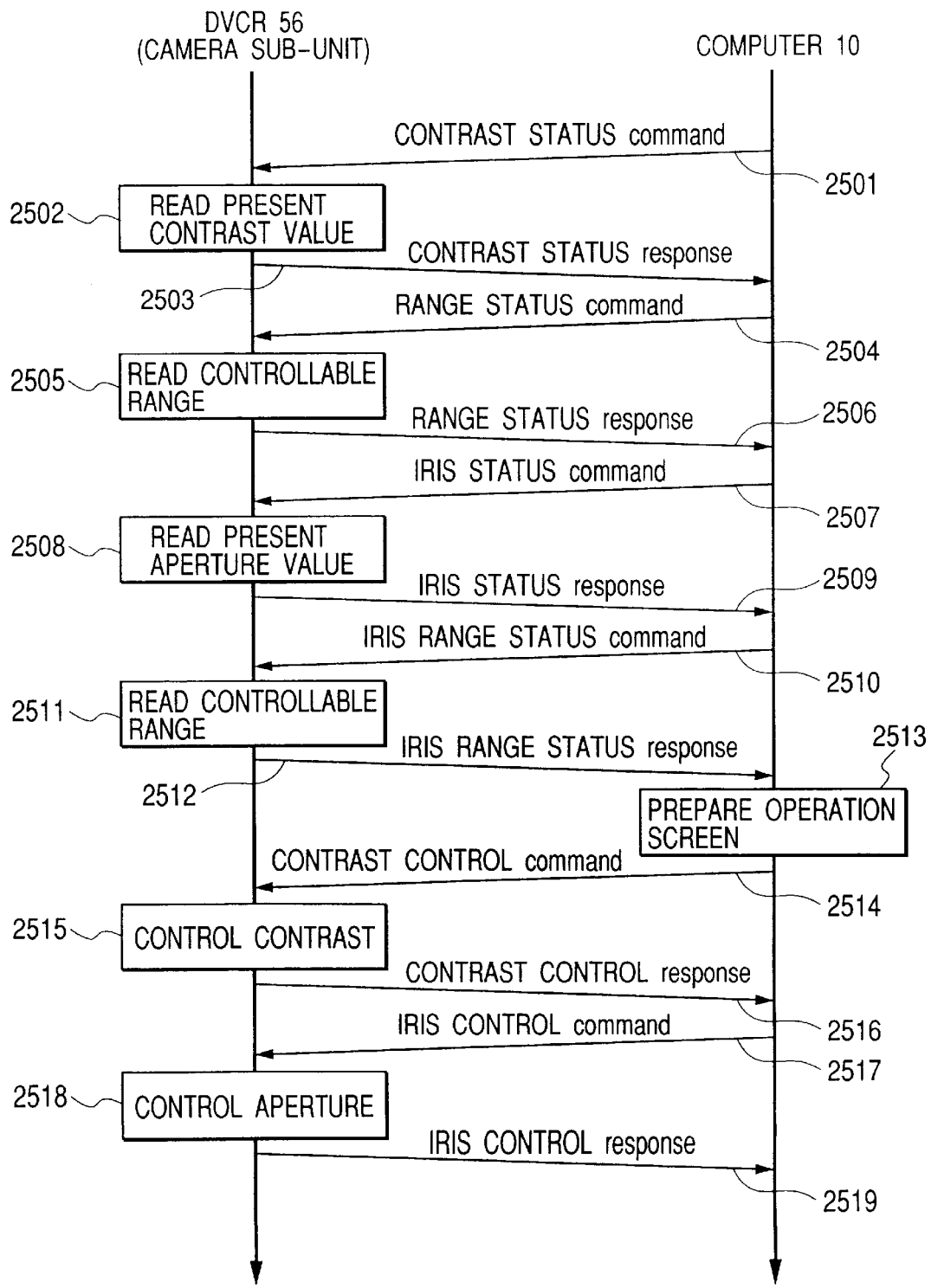
FIG. 25 is a diagram showing the procedure of remotely controlling each function of a camera subunit.

Next, with reference to FIG. 25, the sequence of adjusting the image quality of a digital image under isochronous transfer from DVCR 56 to the digital TV 30 and computer 10, by remotely controlling the functions of the DVCR 56 and camera subunit serving as the target by the computer 10 serving as the controller.

(4-1) Remote Control of Contrast, Gamma, Hue, Saturation, Setup Level and Sharpness First, with reference to FIG. 25, a process of remotely controlling the contrast, gamma, hue, saturation, setup level and sharpness will be described. Since each function can be controlled by a similar process, the contrast adjustment function will be described by way of example and the description of the other functions are omitted.

The application transmits the CONTRAST STATUS command to the camera subunit, and acquires from the response to the command the contrast value of a digital image which the digital TV 30 isochronously transmits presently (2501 to 2503 in FIG. 25).

Thereafter, the application transmits the RANGE STATUS command (2504 in FIG. 25). From the response to this command, the application recognizes the present set value and the upper and lower limits of the controllable range (2505, 2506 in FIG. 25). By using these values, the application generates the indicator 2406 shown in FIG. 24 and displays it (2513 in FIG. 25).

When the contrast adjustment button 2404*a* is depressed, the application controls the camera subunit to increase the contrast by one level. At this time, the application generates the CONTRAST CONTROL command having "$01_{16}$" set to operand[0] and asynchronously transfers it to the digital TV 30 (2514 in FIG. 25).

On the other hand, when the contrast adjustment button 2404*b* is depressed, the application controls the camera subunit to decrease the contrast by one level. At this time, the application generates the CONTRAST CONTROL command having "$02_{16}$" set to operand[0] and asynchronously transfers it to the digital TV 30 (2514 in FIG. 25).

After the CONTRAST CONTROL command is received, the camera subunit adjusts the iris of the optical system and asynchronously transfers the CONTRAST CONTROL response to the computer 10 (2515, 2516 in FIG. 25).

(4-2) Remote Control of Iris

Next, with reference to FIG. 25, a process of remotely controlling the iris adjustment function will be described.

The application transmits the IRIS STATUS command to the camera subunit, and acquires from the response to the command the present iris value of the camera unit (2507 to 2509 in FIG. 25).

Thereafter, the application transmits the IRIS RANGE STATUS command (2510 in FIG. 25). From the response to this command, the application recognizes the present set value and the upper and lower limits of the controllable range (2511, 2512 in FIG. 25). By using these values, the application generates the indicators 2430 to 2434 shown in FIG. 24 and displays them (2513 in FIG. 25).

When the iris adjustment button 2428*a* is depressed, the application controls the camera subunit to close the iris by one level. At this time, the application generates the IRIS CONTROL command having "$01_{16}$" set to operand[0] and asynchronously transfers it to the digital TV 30 (2517 in FIG. 25).

On the other hand, when the iris adjustment button 2428*b* is depressed, the application controls the camera subunit to open the iris by one level. At this time, the application generates the IRIS CONTROL command having "$02_{16}$" set to operand[0] and asynchronously transfers it to the digital TV 30 (2517 in FIG. 25).

After the IRIS CONTROL command is received, the camera subunit adjusts the iris of the optical system and asynchronously transfers the IRIS CONTROL response to the computer 10 (2515, 2519 in FIG. 25).

With the processes (4-1) and (4-2), the application of this embodiment can inquire the present set value and the upper and lower limits of the controllable range of each function of the camera subunit, and these values can be reflected upon a plurality of GUIs (i.e., indicators 2406, 2410, 2414, 2428, 2422, 2426, 2430 to 2434). Accordingly, the application of this embodiment allows the user to very easily recognize the present status and controllable range of the contrast, gamma, hue, saturation, setup level and sharpness of the digital image under isochronous transfer by the camera unit, and of the iris of the camera subunit.

Furthermore, it is possible to change in real time the contrast, gamma, hue, saturation, setup level, sharpness and exposure of the digital image under isochronous transfer by the camera subunit, by directly operating upon the indicators while looking at the digital image.

The application of this embodiment can remotely control not only the contrast, gamma, hue, saturation, setup level, and sharpness, but also a so-called exposure shift operation of changing the target values of lightness, frame frequency, focal distance, object distance, shutter speed, gain and exposure.

Figure 26:
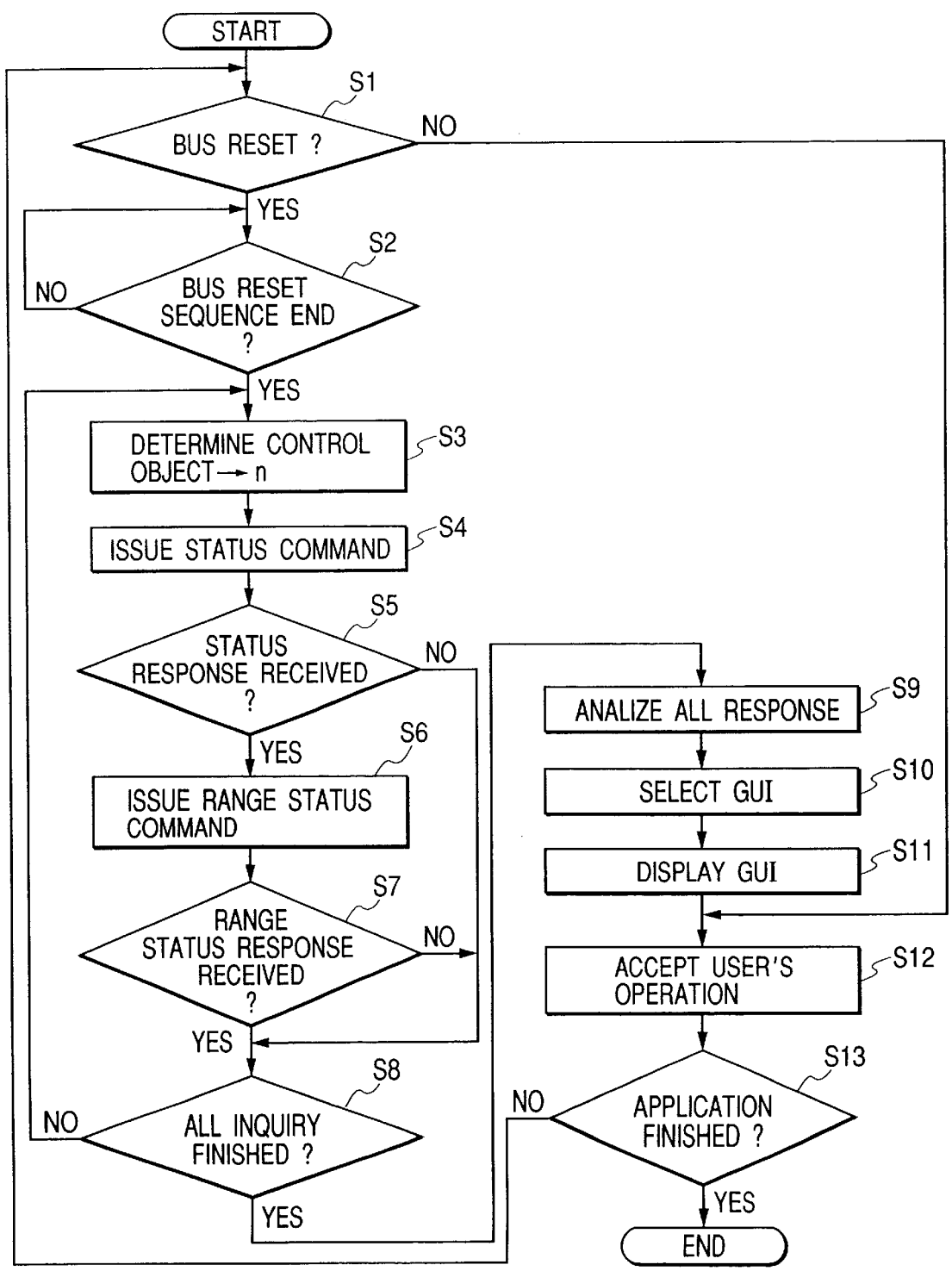
FIG. 26 is a flow chart illustrating another example of the procedure an application of this embodiment.

Next, with reference to the flow chart shown in FIG. 26, the operation to be executed by the application of this embodiment will be described.

At Step S1, the application detects a bus reset. If the bus reset does not occur, at Step S2 the application acknowledges a user operation. If a bus reset occurs, the flow advances to Step S2.

At Step S2 the application checks whether the sequence of the bus reset is completed. After the sequence of the bus reset is completed and a new node ID of the digital TV 30 or DVCR 56 is detected, the flow advances to Step S3.

At Step S3 the application selects the function to be remotely controlled, from the functions of the digital TV 30 or DVCR 56.

At Step S4 the application generates STATUS commands corresponding in number to n (n≧1) functions to be remotely controlled. The STATUS commands are sequentially transmitted to the digital TV 30 or camera subunit. Communications between the computer 10 and digital TV 30 are processed as illustrated in FIG. 15, and communications between the computer 10 and DVCR 56 are processed as illustrated in FIG. 25.

At Step S5, the application waits for the STATUS response of each function. If the STATUS response cannot be received and the STATUS response indicating that the STATUS command is not supported is received, the application judges that the function corresponding to the response cannot be controlled, to thereafter follow Step S8. If the STATUS response is received and it is judged that the function can be controlled, the flow advances to Step S6.

At Step S6 the application generates the RANGE STATUS commands corresponding to the functions judged as controllable, and sequentially transmits them to the digital TV 30 or camera subunit. Communications between the computer 10 and digital TV 30 are processed as illustrated in FIG. 15, and communications between the computer 10 and DVCR 56 are processed as illustrated in FIG. 25.

At Step S7 the application waits for the RANGE STATUS response of each function. If the RANGE STATUS response cannot be received and the RANGE STATUS response indicating that the STATUS command is not supported is received, the application judges that the function corresponding to the response cannot be controlled, to thereafter follow Step S8. If the RANGE STATUS response is received and it is judged that the function can be controlled, the flow advances to Step S8.

At Step S8 the application repeats Steps S3 to S7 for all n (n≧1) functions to be remotely controlled.

At Step S9 the application analyzes all received responses to recognize the operable range and present level of each function. At Step S10 the application selects the function to be displayed as GUI. At Step S11 the application configures GUI such as shown in FIG. 14 or 24 and displays it.

At Step S12 the application acknowledges a user operation, generates a CONTROL command corresponding to the user operation, and transmits it to the digital TV 30 or camera subunit. Communications between the computer 10 and digital TV 30 are processed as illustrated in FIG. 15, and communications between the computer 10 and DVCR 56 are processed as illustrated in FIG. 25.

At Step S13 the application checks whether there is a finish request. If not, the flow returns to Step S1, whereas if there is a finish request, the flow is terminated.

With this procedure, the application of this embodiment can display the function of the digital TV 30 or DVCR 56 as GUI and can remotely control the function designated by a user. Each time a new connection topology of the network is recognized by the bus reset, the application of this embodiment can display again GUI of each function. Accordingly, even if the status of the target (digital TV 30 or DVCR 56) is changed by a bus reset, the latest status can be displayed always.

The processes at Steps S1, S2, S5 and S7 may be performed asynchronously through software or hardware interrupt.

Next, the sequence of recognizing a remotely controllable function from a plurality of functions of the digital TV 30 by using CONTROL/STATUS commands defined in this embodiment, will be described. In this case, the computer 10 is the controller and the digital TV 30 is the target.

Another example of the CONTROL/STATUS command defined by this embodiment will be described in detail. In this embodiment, an opcode 736 such as shown in FIG. 27 is newly defined.

In the embodiment, a command frame having the value of opcode 736 of "$40_{16}$" is called an "APERTURE command", a command frame having the value of opcode 736 of "$41_{16}$" is called a "BRIGHTNESS command", a command frame having the value of opcode 736 of "$42_{16}$" is called a "CHROMA command", a command frame having the value of opcode 736 of "$43_{16}$" is called a "CONTRAST command", a command frame having the value of opcode 736 of "$44_{16}$" is called a "PHASE command", and a command frame having the value of opcode 736 of "$72_{16}$" is called a "SUPPORT LEVEL PROFILE STATUS command".

The APERTURE, BRIGHTNESS, CHROMA, CONTRAST AND PHASE commands have similar functions to those of the commands described in (1-1) to (1-5), and the detailed description thereof is omitted.

(5-1) SUPPORT LEVEL PROFILE STATUS Command

Next, the function of the SUPPORT LEVEL PROFILE STATUS command will be described.

The SUPPORT LEVEL PROFILE STATUS command is a status command for inquiring whether the digital TV 30 as the target is installed with the APERTURE, BRIGHTNESS, CHROMA, CONTRAST and PHASE commands.

FIG. 29 shows an example of the structure of the SUPPORT LEVEL PROFILE STATUS command. In FIG. 29, the first byte is opcode 736 in which a value "$72_{16}$" representative of the SUPPORT LEVEL PROFILE STATUS command is stored. A dummy byte "$FF_{16}$" is set to operand [0]. The dummy byte is not limited to "$FF_{16}$", but "$7F_{16}$", "$3F_{16}$", "$1F_{16}$" or the like may also be used.

Next, the function of a SUPPORT LEVEL PROFILE STATUS response will be described. The SUPPORT LEVEL PROFILE STATUS response is a response frame corresponding to the SUPPORT LEVEL PROFILE STATUS command.

FIG. 30 shows an example of the structure of the SUPPORT LEVEL PROFILE STATUS response. In FIG. 30, a value corresponding to the SUPPORT LEVEL PROFILE STATUS command, i.e., "$72_{16}$", is set to opcode 736. The operand[0] is a profile field. Set to this profile field are support status codes (hereinafter called a profile code) of the APERTURE, BRIGHTNESS, CHROMA, CONTRAST AND PHASE commands. The controller recognizes from this profile code which function can be controlled and which function cannot be controlled among the functions of the digital TV 30 as the target.

Next, the profile code to be set to the profile field will be described with reference to FIG. 28. The profile code is an 8-bit code, each bit corresponding to a predetermined function.

For example, if the seventh bit (bit 7: most significant bit) is "1", it means that the APERTURE command is supported. If the sixth bit (bit 6) is "1", it means that the BRIGHTNESS command is supported. If the fifth bit (bit 5) is "1", it means that the CHROMA command is supported. If the fourth sixth bit (bit 5) is "1", it means that the CONTRAST command is supported. If the third bit (bit 3) is "1", it means that the PHASE command is supported. The second bit (bit 2) to 0-th bit (bit 0) are reserved for other functions. The second bit (bit 2) to 0-th bit (bit 0) are set always to "0".

Next, with reference to FIGS. 31 to 33, the sequence of recognizing a remotely controllable function among a plurality of functions of the digital TV 30 as the target by the computer 10 as the controller, will be described.

Figure 31:
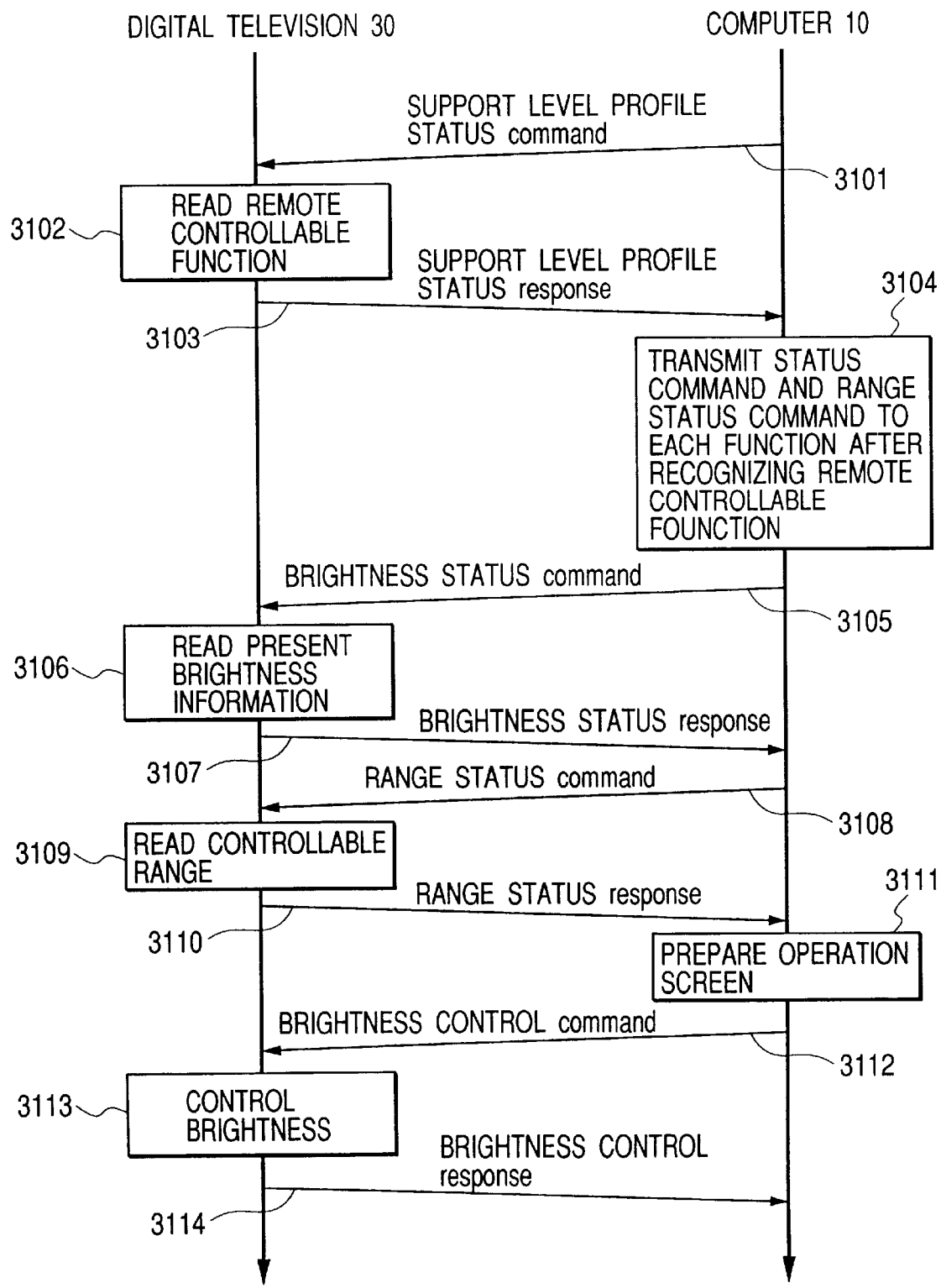
FIG. 31 is a diagram illustrating the procedure of inquiring a remotely operable function.

The application transmits the SUPPORT LEVEL PROFILE STATUS command to the digital TV 30 (3101 in FIG. 31). The digital TV 30 checks the remotely controllable function from brightness, contrast, chroma, and color density and resolution, and generates the SUPPORT LEVEL PROFILE STATUS response (3102 in FIG. 31).

Figure 32:
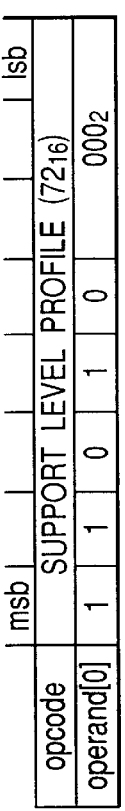
FIG. 32 is a diagram showing an example of the SUPPORT LEVEL PROFILE STATUS response.

An example of the SUPPORT LEVEL PROFILE STATUS response generated by the digital TV 30 is shown in FIG. 32. "$72_{16}$" is set to opcode 736, and "$Do_{16}$" is set to operand[0] (profile field). In this example, it means that the digital TV 30 supports the APERTURE command (seventh bit of "1"), BRIGHTNESS command (sixth bit of "1") and CONTRAST command (fourth bit of "1") and does not support the CHROMA command (fifth bit of "0" and PHASE command (third bit of "0").

After the SUPPORT LEVEL PROFILE STATUS response is received, the application recognizes a remotely controllable function among a plurality of functions of the digital TV 30. For example, if the SUPPORT LEVEL PROFILE STATUS response shown in FIG. 32 is received, the application recognizes that the digital TV 30 does not support the CHROMA command and PHASE command. Next, the application transmits the STATUS command and RANGE STATUS command for the function recognized remotely controllable (3104 in FIG. 31). The sequence of transmitting the STATUS command and RANGE STATUS command for each function is executed as illustrated in FIG. 15.

After the STATUS command and RANGE STATUS command for each function are received (3105 to 3110 in FIG. 31), the application configures GUI (3111 in FIG. 31). An example of GUI configured by the application is shown in FIG. 33.

Figure 33:
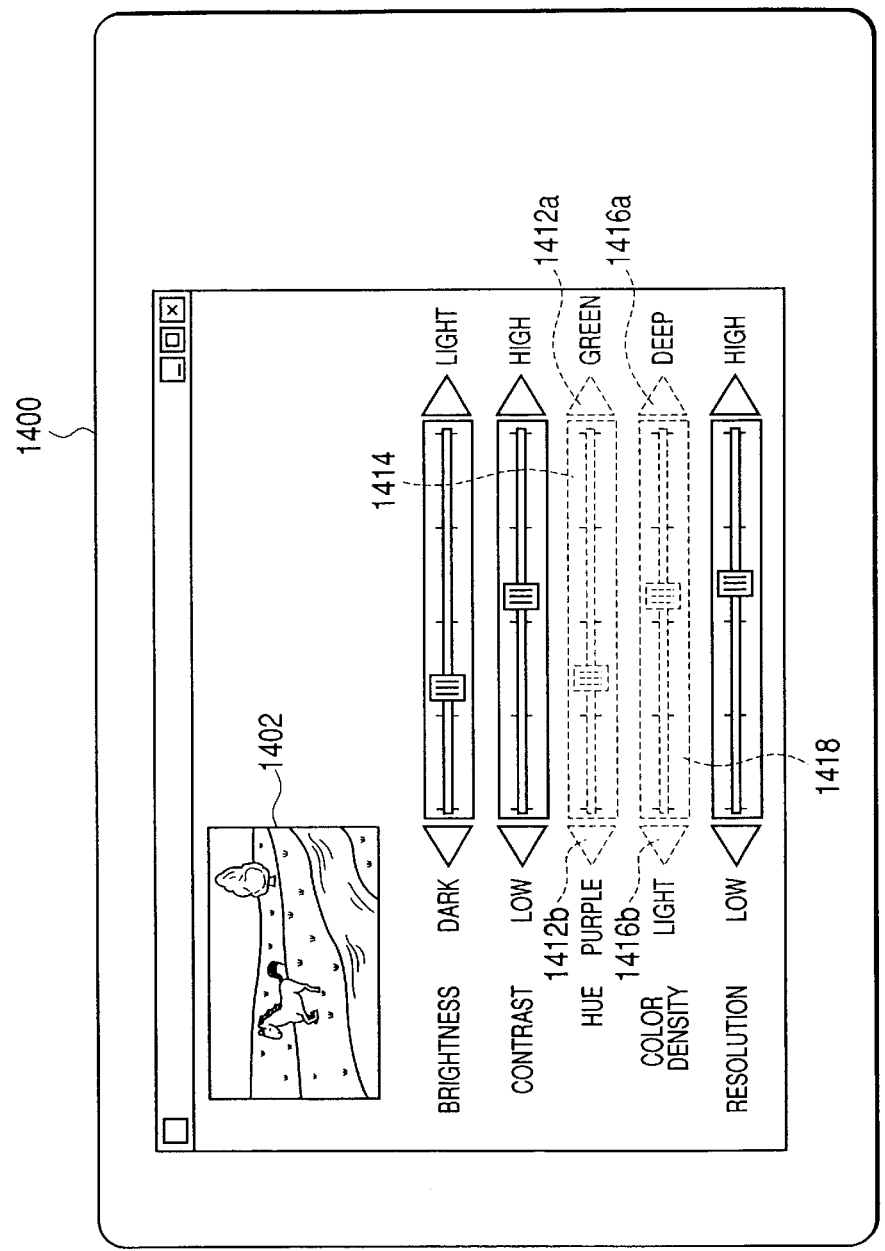
FIG. 33 is a diagram showing another example of GUI of this embodiment.

FIG. 33 shows an example wherein the digital TV 30 does not support the CHROMA and PHASE commands. In this case, adjustment buttons 1412a, 1412b, 1416a and 1416b and indicators 1414 and 1416 are displayed thin (or by broken lines). The user can easily know the function unable to be remotely controlled and the user operability can be improved considerably. Thereafter, by using GUI, the user remotely controls the brightness, contrast and resolution (3112 to 3114 in FIG. 31).

In this example, as a method of notifying the user of the function unable to be remotely controlled, the adjustment buttons and indicators are shown thin. Obviously other methods may also be used, such as not displaying the adjustment buttons and indicators, and displaying a superposed inhibition mark.

Figure 34:
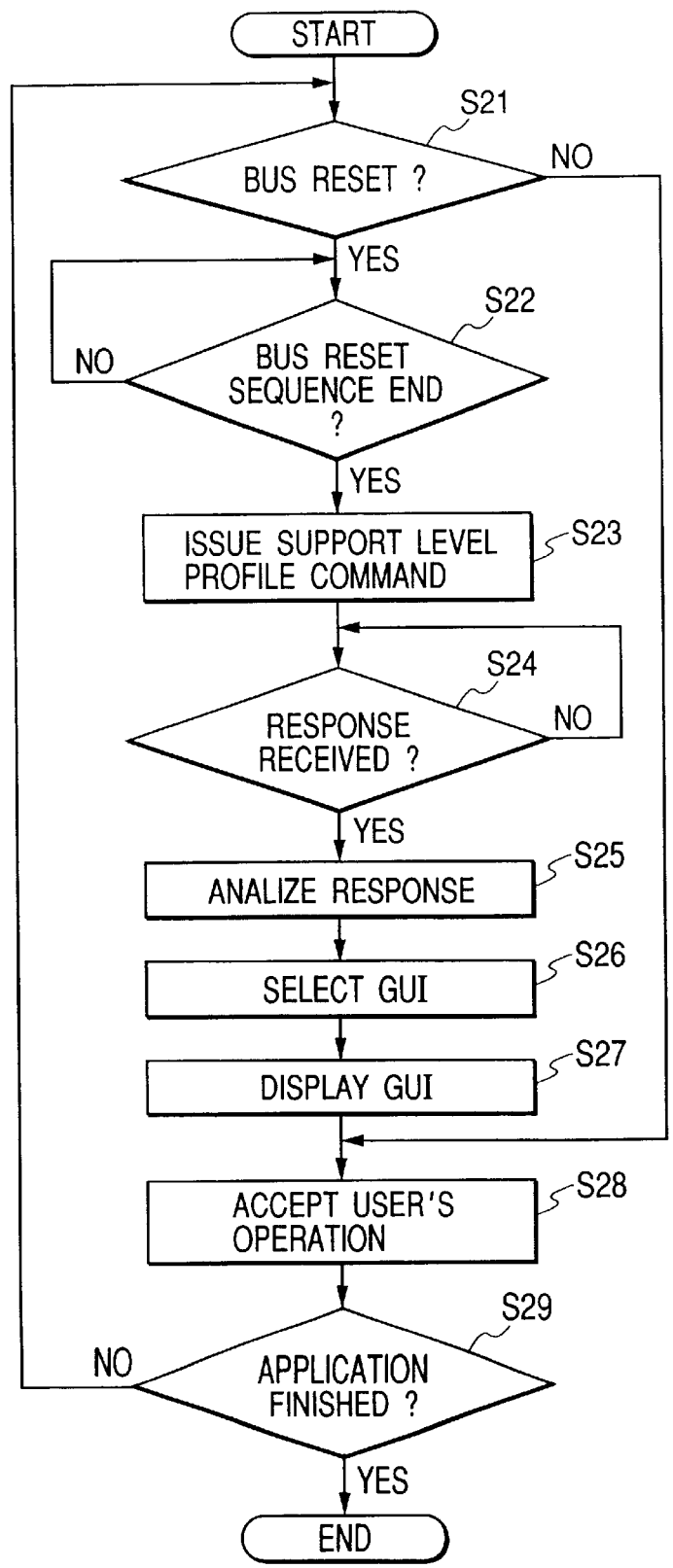
FIG. 34 is a flow chart illustrating the procedure of configuring GUI of this embodiment.

Next, the operation of the application of this embodiment will be described with reference to the flow chart of FIG. 34.

At Step S21, the application detects a bus reset. If the bus reset does not occur, at Step S28 the application acknowledges a user operation. If a bus reset occurs, the flow advances to Step S22.

At Step S22 the application checks whether the sequence of the bus reset is completed. After the sequence of the bus reset is completed and a new node ID of the digital TV 30 is detected, the flow advances to Step S23.

At Step S23 the application generates the SUPPORT LEVEL PROFILE STATUS command and transmits it to the digital TV 30. Communications between the computer 10 and digital TV 30 are executed as illustrated in FIG. 31.

At Step S24 the application waits for the SUPPORT LEVEL PROFILE STATUS response. When the STATUS response is received, the flow advances to Step S25.

At Step S25 the application analyzes the SUPPORT LEVEL PROFILE STATUS response to recognize the remotely controllable function. Next, the application transmits the STATUS command described in (1-1) to (1-5) and RANGE STATUS command described in (1-6) for the function recognized remotely controllable.

At Step S26 the application selects the function to be displayed by GUI. At Step S27 the application configures GUI such as shown in FIG. 33 and displays it.

At Step S28 the application acknowledges a user operation, generates a CONTROL command corresponding to the user operation, and transmits it to the digital TV 30. Communications between the computer 10 and digital TV 30 are processed as illustrated in FIG. 15.

At Step S29 the application checks whether there is a finish request. If not, the flow returns to Step S21, whereas if there is a finish request, the flow is terminated.

With this procedure, the application of this embodiment can display the remotely controllable function of the digital TV 30 by GUI among a plurality of functions, and can remotely control the function designated by a user. Each time a new connection topology of the network is recognized by the bus reset, the application of this embodiment can display again GUI of each function. Accordingly, even if the status of the target (digital TV 30) is changed by a bus reset, the latest status can be displayed always.

The processes at Steps S21, S22 and S24 may be performed asynchronously through software or hardware interrupt.

In this embodiment, the SUPPORT LEVEL PROFILE STATUS command is transmitted to the digital TV 30 as the target. The SUPPORT LEVEL PROFILE STATUS command may be transmitted to the camera subunit of DVCR 56 as the target. In this case, respective bits of operand[1] of the SUPPORT LEVEL PROFILE STATUS response indicate whether the CONTRAST, GAMMA, HUE, SATURATION, SETUP LEVEL, SHARPNESS, and IRIS commands are supported or not.

For example, the seventh bit (bit 7: most significant bit) of operand[1], sixth bit (bit 6), fifth bit (bit 5), fourth bit (bit 4), third bit (bit 3), second bit (bit 2), first bit (bit 1) respectively indicate whether the CONTRAST, GAMMA, HUE, SATURATION, SETUP LEVEL, SHARPNESS AND IRIS commands are supported.

The embodiment is applicable to a single apparatus and to a system constituted of a plurality of apparatus such as host computers, interface apparatus, readers and printers.

The embodiment can be realized by supplying software program codes realizing the functions of the embodiment to a computer (CPU or MPU) of a system or apparatus with various devices, and by reading and executing the programs codes stored in the computer to operate the devices.

In such a case, the software program codes themselves realize the functions of the embodiment. Therefore, the program codes themselves and means for supplying the program codes to the computer constitute the embodiment.

For example, a storage medium storing such program codes realizing the functions of the embodiment constitutes the embodiment. Namely, the storage medium storing such program codes realizing the functions of the embodiment, including magnetic disk media such as a floppy disk and a hard disk, optical disk media such as a magnetooptical disk and a CD-ROM, tape media such as a magnetic tape, nonvolatile memories such as a flash memory, various ROMs such as a program ROM, an EPROM and an EEPROM, other various memories, is applicable to the embodiment.

It is obvious that the embodiment also contains not only the case wherein the functions of the embodiment can be realized by executing the program codes read by a computer, but also the case wherein the functions of the embodiment can be realized by executing the program codes together with an operating system (OS) running on the computer or another application.

It is obvious that the embodiment also contains the case wherein the functions of the embodiment can be realized by writing supplied program codes into a memory of a function expansion board of a computer or a function expansion unit connected to the computer, and thereafter by executing a portion or the whole of actual processes by a CPU of the function expansion board or function expansion unit.

The invention may be embodied in other specific forms without departing from the spirit or essential characteristics thereof.

For example, although the application of the embodiment is stored in the computer 10 itself, GUI may be configured by utilizing an application stored in another apparatus.

For example, the application of the embodiment may be stored in EEPROM 88 of DVCR 56, downloaded into the computer 10 by using the asynchronous transfer mode, and thereafter initiating the application to configure GUI.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A method for a control apparatus that remotely controls an image capture apparatus including a contrast adjusting function for adjusting a contrast value of the image capture apparatus, the method comprising the steps of:

transmitting from the control apparatus to the image capture apparatus a first command requesting a current contrast value of the contrast adjusting function of the image capture apparatus;

transmitting from the control apparatus to the image capture apparatus a second command requesting a remotely controllable range of the contrast adjusting function;

detecting the current contrast value of the contrast adjusting function from a response of the first command transmitted by the image capture apparatus;

detecting the remotely controllable range of the contrast adjusting function from a response of the second command transmitted by the image capture apparatus; and displaying the current contrast value and the remotely controllable range of the contrast adjusting function on a display unit of the control apparatus.

2. A method for a control apparatus that remotely controls an image capture apparatus including a gamma adjusting function for adjusting a gamma value of the image capture apparatus, the method comprising the steps of:

transmitting from the control apparatus to the image capture apparatus a first command requesting a current gamma value of the gamma adjusting function of the image capture apparatus;

transmitting from the control apparatus to the image capture apparatus a second command requesting a remotely controllable range of the gamma adjusting function;

detecting the current gamma value of the gamma adjusting function from a response of the first command transmitted by the image capture apparatus;

detecting the remotely controllable range of the gamma adjusting function from a response of the second command transmitted by the image capture apparatus; and displaying the current gamma value and the remotely controllable range of the gamma adjusting function on a display unit of the control apparatus.

3. A method for a control apparatus that remotely controls an image capture apparatus including a sharpness adjusting function for adjusting a sharpness value of the image capture apparatus, the method comprising the steps of:

transmitting from the control apparatus to the image capture apparatus a first command requesting a current sharpness value of the sharpness adjusting function of the image capture apparatus;

transmitting from the control apparatus to the image capture apparatus a second command requesting a remotely controllable range of the sharpness adjusting function;

detecting the current sharpness value of the sharpness adjusting function from a response of the first command transmitted by the image capture apparatus;

detecting the remotely controllable range of the sharpness adjusting function from a response of the second command transmitted by the image capture apparatus; and displaying the current sharpness value and the remotely controllable range of the sharpness adjusting function on a display unit of the control apparatus.

4. A method for a control apparatus that remotely controls an image capture apparatus including an aperture adjusting function for adjusting an aperture value of the image capture apparatus, the method comprising the steps of:

transmitting from the control apparatus to the image capture apparatus a first command requesting a current aperture value of the aperture adjusting function of the image capture apparatus;

transmitting from the control apparatus to the image capture apparatus a second command requesting a remotely controllable range of the aperture adjusting function;

detecting the current aperture value of the aperture adjusting function from a response of the first command transmitted by the image capture apparatus;

detecting the remotely controllable range of the aperture adjusting function from a response of the second command transmitted by the image capture apparatus; and displaying the current aperture value and the remotely controllable range of the aperture adjusting function on a display unit of the control apparatus.

5. A method for an image capture apparatus that includes a contrast adjusting function for adjusting a contrast value of the image capture apparatus, the method comprising the steps of:

if the image capture apparatus receives from a control apparatus a first command requesting a current contrast value of the contrast adjusting function, transmitting from the image capture apparatus to the control apparatus a response of the first command in order to notify the control apparatus of the current contrast value of contrast adjusting function; and if the image capture apparatus receives from the control apparatus a second command requesting a remotely controllable range of the contrast adjusting function, transmitting from the image capture apparatus to the control apparatus a response of the second command in order to notify the control apparatus of the remotely controllable range of the contrast adjusting function.

6. A method for an image capture apparatus that includes a gamma adjusting function for adjusting a gamma value of the image capture apparatus, the method comprising the steps of:

if the image capture apparatus receives from a control apparatus a first command requesting a current gamma value of the gamma adjusting function, transmitting from the image capture apparatus to the control apparatus a response of the first command in order to notify the control apparatus of the current gamma value of the gamma adjusting function; and if the image capture apparatus receives from the control apparatus a second command requesting a remotely controllable range of the gamma adjusting function, transmitting from the image capture apparatus to the control apparatus a response of the second command in order to notify the control apparatus of the remotely controllable range of the gamma adjusting function.

7. A method for an image capture apparatus that includes a sharpness adjusting function for adjusting a sharpness value of the image capture apparatus, the method comprising the steps of:

if the image capture apparatus receives from a control apparatus a first command requesting a current sharpness value of the sharpness adjusting function, transmitting from the image capture apparatus to the control apparatus a response of the first command in order to notify the control apparatus of the current sharpness value of the sharpness adjusting function; and if the image capture apparatus receives from the control apparatus a second command requesting a remotely controllable range of the sharpness adjusting function, transmitting from the image capture apparatus to the control apparatus a response of the second command in order to notify the control apparatus of the remotely controllable range of the sharpness adjusting function.

8. A method for an image capture apparatus that includes an aperture adjusting function for adjusting an aperture value of the image capture apparatus, the method comprising the steps of:

if the image capture apparatus receives from a control apparatus a first command requesting a current aperture value of the aperture adjusting function, transmitting from the image capture apparatus to the control apparatus a response of the first command in order to notify the control apparatus of the current aperture value of the aperture adjusting function; and if the image capture apparatus receives from the control apparatus a second command requesting a remotely controllable range of the aperture adjusting function, transmitting from the image capture apparatus to the control apparatus a response of the second command in order to notify the control apparatus of the remotely controllable range of the aperture adjusting function.

* * * * *

UNITED STATES PATENT AND TRADEMARK OFFICE
CERTIFICATE OF CORRECTION

PATENT NO.    : 6,879,348 B1
DATED         : April 12, 2005
INVENTOR(S)   : Mitsuo Niida It is certified that error appears in the above-identified patent and that said Letters Patent is hereby corrected as shown below:

Drawings,
Sheet 9, Fig. 10, "INPLEMENTED" should read -- IMPLEMENTED --.
Sheet 16, Fig. 26, "ANALIZE" should read -- ANALYZE --.
Sheet 18, Fig. 31, "FOUNCTION" should read -- FUNCTION --.
Sheet 20, Fig. 34, "ANALIZE" should read -- ANALYZE --.

Column 12,
Line 56, ""CONTROL," should read -- "CONTROL", --.

Column 17,
Line 2, ""7F$_{16}$, "3F$_{16}$," "1F$_{16}$," should read -- "7F$_{16}$", "3F$_{16}$", "1F$_{16}$", --.

Column 20,
Line 26, "01$_{16}$"" should read -- "01$_{16}$" --.

Column 22,
Line 6, delete paragraph break after "displayed.".

Column 25,
Line 61, "FF$_{1616}$" should read -- FF$_{16}$ --; and
Line 63, ""7F$_{16}$, "3F$_{16}$," "1F$_{16}$," should read -- "7F$_{16}$", "3F$_{16}$", "1F$_{16}$", --.

Column 27,
Line 62, "(4-1)" should read -- (4-1) --.

Column 29,
Line 62, ""3F$_{16}$'," should read -- "3F$_{16}$", --.

Column 30,
Line 20, "sixth" should be deleted; and
Line 21, "(bit 5)" should read -- (bit 4) --.

UNITED STATES PATENT AND TRADEMARK OFFICE
CERTIFICATE OF CORRECTION

PATENT NO. : 6,879,348 B1
DATED : April 12, 2005
INVENTOR(S) : Mitsuo Niida

It is certified that error appears in the above-identified patent and that said Letters Patent is hereby corrected as shown below:

Column 32,
Line 11, "programs" should read -- program --.

Signed and Sealed this

Twenty-first Day of March, 2006

JON W. DUDAS
*Director of the United States Patent and Trademark Office*